(12) United States Patent
Taylor et al.

(10) Patent No.: US 8,849,802 B2
(45) Date of Patent: Sep. 30, 2014

(54) HISTORICAL BROWSING SESSION MANAGEMENT

(75) Inventors: Brett R. Taylor, Seattle, WA (US); James R. Hamilton, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 223 days.

(21) Appl. No.: 13/246,806

(22) Filed: Sep. 27, 2011

(65) Prior Publication Data

US 2013/0080421 A1 Mar. 28, 2013

(51) Int. Cl.
*G06F 17/30* (2006.01)
*G06F 7/00* (2006.01)

(52) U.S. Cl.
USPC .......................................................... 707/722

(58) Field of Classification Search
USPC .......................................................... 707/722
See application file for complete search history.

(56) References Cited

U.S. PATENT DOCUMENTS

| | | | |
|---|---|---|---|
| 5,872,850 A | 2/1999 | Klein et al. | |
| 6,049,812 A * | 4/2000 | Bertram et al. | 715/205 |
| 6,108,637 A | 8/2000 | Blumenau | |
| 6,138,156 A | 10/2000 | Fletcher et al. | |
| 6,430,624 B1 | 8/2002 | Jamtgaard et al. | |
| 6,560,620 B1 | 5/2003 | Ching | |
| 6,625,624 B1 | 9/2003 | Chen et al. | |
| 6,704,024 B2 | 3/2004 | Robotham et al. | |
| 6,871,236 B2 | 3/2005 | Fishman et al. | |
| 6,944,665 B2 | 9/2005 | Brown et al. | |
| 7,003,442 B1 | 2/2006 | Tsuda | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,543,059 B2 | 6/2009 | Johnson et al. | |
| 7,831,582 B1 * | 11/2010 | Scofield et al. | 707/706 |
| 7,975,000 B2 | 7/2011 | Dixon et al. | |
| 8,010,545 B2 | 8/2011 | Stefik et al. | |
| 8,185,621 B2 | 5/2012 | Kasha | |
| 8,271,887 B2 | 9/2012 | Offer et al. | |
| 8,316,124 B1 | 11/2012 | Baumback et al. | |
| 8,336,049 B2 | 12/2012 | Medovich | |
| 2001/0039490 A1 | 11/2001 | Verbitsky et al. | |
| 2002/0030703 A1 | 3/2002 | Robertson et al. | |
| 2002/0194302 A1 | 12/2002 | Blumberg | |
| 2003/0023712 A1 | 1/2003 | Zhao et al. | |
| 2004/0083294 A1 | 4/2004 | Lewis | |
| 2004/0139208 A1 | 7/2004 | Tuli | |

(Continued)

OTHER PUBLICATIONS

Rao, H.C.-H., et al., "A Proxy-Based Personal Web Archiving Service," Operating Systems Review, 35(1):61-72, 2001.

(Continued)

*Primary Examiner* — Kuen Lu
(74) *Attorney, Agent, or Firm* — Knobbe, Martens, Olson & Bear, LLP

(57) ABSTRACT

A remote browsing process is directed to the generation and management of a remote browse session at a network computing and storage provider. A client computing device provides a search request to a network computing and storage provider. Responsive to the search request, the network computing and storage provider provides search results corresponding to historical content representations associated with content previously requested by the client computing device or a user associated with the client computing device. The network computing and storage provider may determine the search results based on a navigation path associated with a previous request for content, or based on any number of other factors.

29 Claims, 15 Drawing Sheets

(56) References Cited

U.S. PATENT DOCUMENTS

| | | |
|---|---|---|
| 2004/0181613 A1 | 9/2004 | Hashimoto et al. |
| 2004/0205448 A1 | 10/2004 | Grefenstette et al. |
| 2004/0220905 A1 | 11/2004 | Chen et al. |
| 2004/0243622 A1 | 12/2004 | Morisawa |
| 2005/0010863 A1 | 1/2005 | Zernik |
| 2005/0060643 A1 | 3/2005 | Glass et al. |
| 2005/0138382 A1 | 6/2005 | Hougaard et al. |
| 2005/0183039 A1 | 8/2005 | Revis |
| 2005/0246193 A1 | 11/2005 | Roever et al. |
| 2006/0095336 A1 | 5/2006 | Heckerman et al. |
| 2006/0122889 A1 | 6/2006 | Burdick et al. |
| 2006/0168510 A1 | 7/2006 | Bryar et al. |
| 2006/0184421 A1 | 8/2006 | Lipsky et al. |
| 2006/0248442 A1 | 11/2006 | Rosenstein et al. |
| 2006/0277167 A1 | 12/2006 | Gross et al. |
| 2006/0294461 A1 | 12/2006 | Nadamoto et al. |
| 2007/0022072 A1 | 1/2007 | Kao et al. |
| 2007/0027672 A1 | 2/2007 | Decary et al. |
| 2007/0094241 A1 | 4/2007 | M. Blackwell et al. |
| 2007/0124693 A1 | 5/2007 | Dominowska et al. |
| 2007/0288589 A1 | 12/2007 | Chen et al. |
| 2008/0104502 A1 | 5/2008 | Olston |
| 2008/0183672 A1 | 7/2008 | Canon et al. |
| 2008/0184128 A1 | 7/2008 | Swenson et al. |
| 2008/0320225 A1 | 12/2008 | Panzer et al. |
| 2009/0012969 A1 | 1/2009 | Rail et al. |
| 2009/0164924 A1 | 6/2009 | Flake et al. |
| 2009/0204478 A1 | 8/2009 | Kaib et al. |
| 2009/0217199 A1 | 8/2009 | Hara et al. |
| 2009/0254867 A1 | 10/2009 | Farouki et al. |
| 2009/0282021 A1 | 11/2009 | Bennett |
| 2009/0287698 A1 | 11/2009 | Marmaros et al. |
| 2009/0327914 A1 | 12/2009 | Adar et al. |
| 2010/0036740 A1 | 2/2010 | Barashi |
| 2010/0057639 A1 | 3/2010 | Schwarz et al. |
| 2010/0125507 A1 | 5/2010 | Tarantino, Iii et al. |
| 2010/0131594 A1 | 5/2010 | Kashimoto |
| 2010/0138293 A1 | 6/2010 | Ramer et al. |
| 2010/0218106 A1 | 8/2010 | Chen et al. |
| 2010/0293190 A1* | 11/2010 | Kaiser et al. .................. 707/769 |
| 2010/0312788 A1 | 12/2010 | Bailey |
| 2010/0318892 A1 | 12/2010 | Teevan et al. |
| 2010/0332513 A1 | 12/2010 | Azar et al. |
| 2011/0022957 A1 | 1/2011 | Lee |
| 2011/0029854 A1 | 2/2011 | Nashi et al. |
| 2011/0055203 A1 | 3/2011 | Gutt et al. |
| 2011/0078140 A1* | 3/2011 | Dube et al. .................... 707/727 |
| 2011/0119661 A1 | 5/2011 | Agrawal et al. |
| 2011/0173177 A1 | 7/2011 | Junqueira et al. |
| 2011/0178868 A1 | 7/2011 | Garg et al. |
| 2011/0185025 A1 | 7/2011 | Cherukuri et al. |
| 2011/0191327 A1 | 8/2011 | Lee |
| 2011/0197121 A1 | 8/2011 | Kletter |
| 2011/0246873 A1 | 10/2011 | Tolle et al. |
| 2011/0289074 A1 | 11/2011 | Leban |
| 2011/0296341 A1 | 12/2011 | Koppert |
| 2011/0302510 A1 | 12/2011 | Harrison et al. |
| 2012/0072821 A1 | 3/2012 | Bowling |
| 2012/0084644 A1 | 4/2012 | Robert et al. |
| 2012/0096365 A1 | 4/2012 | Wilkinson et al. |
| 2012/0143944 A1 | 6/2012 | Reeves et al. |
| 2012/0150844 A1 | 6/2012 | Lindahl et al. |
| 2012/0166922 A1 | 6/2012 | Rolles |
| 2012/0198516 A1 | 8/2012 | Lim |
| 2012/0215834 A1 | 8/2012 | Chen et al. |
| 2012/0215919 A1 | 8/2012 | Labat et al. |
| 2012/0284629 A1 | 11/2012 | Peters et al. |
| 2012/0317295 A1 | 12/2012 | Baird et al. |
| 2012/0331406 A1 | 12/2012 | Baird et al. |
| 2013/0031461 A1 | 1/2013 | Hou et al. |
| 2013/0080611 A1 | 3/2013 | Li et al. |

OTHER PUBLICATIONS

Teevan, J., et al., "Changing How People View Changes on the Web," 2009, Proceedings of the $22^{nd}$ Annual ACM Symposium on User Interface Software and Technology, New York, 2009, pp. 237-246.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Chen, H., et al., "Bringing Order the Web: Automatically Categorizing Search Results," Proceedings of the SIGCHI Conference on Human Factors in Computing Systems, Apr. 1-6, 2000, pp. 145-152.

* cited by examiner

HISTORICAL BROWSING SESSION MANAGEMENT

BACKGROUND

Generally described, computing devices and communication networks can be utilized to exchange information. In a common application, a computing device can request content from another computing device via the communication network. For example, a user at a computing device, such as a personal computing device, can utilize a software browser application, typically referred to as a "browser," to request a Web page from a server computing device via the Internet. In such embodiments, the requesting computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

Although many browsers maintain a historical record of Web pages and network resources viewed at the client computing device, browsers tend to maintain limited data about the previously viewed content, often due to storage constraints at the client computing device. Generally, stored information about a previously viewed Web page consists of a URL or other reference to the page, a page title, and/or other basic identifying information. Accordingly, accessing a record of a previously viewed Web page may cause the browser to retrieve the latest version of the Web page or network resource based on the stored URL, and will not display the Web page as it was originally presented at the time of viewing. Further, a user accessing a browser on a different client computing device may not be able to access historical records based on browsing from the first client computing device.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
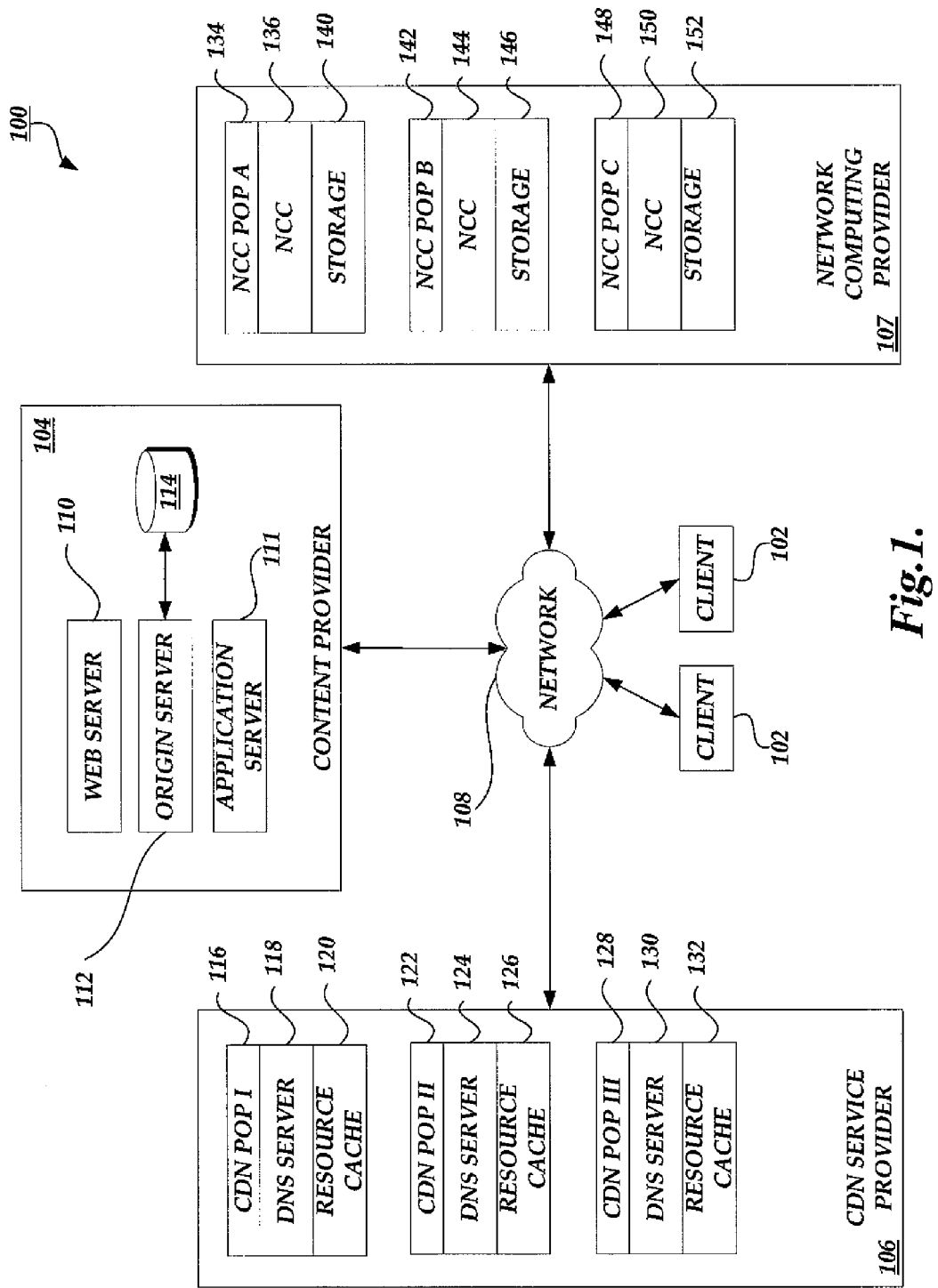
FIG. 1 is a block diagram illustrative of a content delivery environment including a number of client computing devices, content provider, a content delivery network service provider, and a network computing provider.

Generally described, the present disclosure is directed to the generation and management of a remote application session and historical browse content between client computing devices and content providers in conjunction with a network computing provider. Specifically, aspects of the disclosure will be described with regard to the generation and management of historical browse content records between the client computing device and the network computing provider, and the indexing and searching of historical browse content records. Although aspects of the embodiments described in the disclosure will focus, for the purpose of illustration, on the management of a remote browse session and a historical browse storage component, one skilled in the art will appreciate that the techniques disclosed herein may be applied to any number of software processes or applications, and may be applied to preserving historical content of any number of different document and data types. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing provider across a private or public network. The browse session request may include information identifying one or more sources for the requested content. For example, the user may select or enter a URL, (e.g., http://www.xyzwebsite.com) into a browser window, causing the client computing device to transmit a request for a new browse session to the network computing provider, including the selected URL. The browse session request may further include identification information, such as information identifying the user, browser, or client computing device.

In an illustrative embodiment, the network computing provider may process the identification information included in the browse session request to determine a historical browse storage component to associate with the browse session. The historical browse storage component may store historical resource representations, including representations of content requested by the client computing device. Further, and responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network.

Using the instantiated network computing components, the network computing provider may request the identified network resource(s) from one or more content providers, a content delivery network, or a local or associated cache component or data store. For example, the browser software application on the instantiated network computing component can process a primary network resource and then generate additional content requests for content identified in one or more embedded resource identifiers (e.g. pictures, video files, etc.). Illustratively, in the case of other non-browser applications, network resources, or content, may include any file type or format known in the art and supported by the specific software application.

Having obtained the requested content (e.g., the requested network resource and embedded resources), the network computing provider may identify a client remote session browse configuration specifying a remote session communication protocol for use in transmitting the requested content, user interaction data, intermediate processing results, and other information between the browser being executed on the client computing device and the browser being executed at the instantiated network computing component on the computing and storage provider. The information exchanged between the browser on the instantiated network computing component and the browser on the client computing device can be generally referred to as "browser session information." The network computing provider may additionally make any number of further content requests and/or cause the instantiation of additional remote sessions in order to retrieve and process any content referenced by the requested content (e.g., Web pages linked to by the requested Web page). Any number of linked resources up to a specified or determined depth may be retrieved and provided to the historical browse storage component for storage and indexing.

In addition to specifying a remote session communication protocol for transmitting information between the client computing device and the instantiated network computing component, in one embodiment, the identified client remote session browse configuration may specify that one or more processing actions to be performed on the requested content are to be performed at the network computing provider rather than, or in addition to, at the client computing device A Web page, for example, may be parsed and processed to process various HTML layout information and references to associated resources or embedded content, such as CSS style sheets and Javascript, as well as embedded content objects such as images, video, audio, etc. Each object or piece of code may be parsed and processed before a representative object model corresponding to the web page may be constructed and processed further for layout and display. The client remote session browse configuration may identify which of these actions are to be performed at a network computing component and which are to be performed at the client computing device.

The historical browse storage component associated with the remote session may specify an additional historical remote session browse configuration. This historical remote session browse configuration may specify a remote session communication protocol for encapsulating and providing intermediate processing results from the network computing component to the historical browse storage component, and may further specify any processing actions to be performed at the network computing component as described above with reference to the client remote session browse configuration. Illustratively, processing results corresponding to a representation of content stored at a historical browse storage component may be referred to as a historical content representation. Illustratively, remote session communication protocol and/or split of processing specified in the historical remote session browse configuration may be the same or different as the determined client remote session browse configuration.

The client computing device and the instantiated network computing component may exchange processing results via browser session information (e.g., state data or display data representing the requested content result) in accordance with the client remote session browse configuration. The network computing component may further provide historical content representation of the requested content to the historical browse storage component for storage in accordance with the client remote session browse configuration.

At a subsequent point in time, the client computing device may search the stored content at the historical browse storage component. In one embodiment, a client computing device may search the stored content based on a specific cached resource or a historical browse session of interest. In a further embodiment, a client computing device may search only stored content that the user did not view in the original browse session (e.g., resources linked to by viewed resources and stored at the historical browse storage component).

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can correspond to a wide variety of computing devices, including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources, such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including, but not limited to, user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications, including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
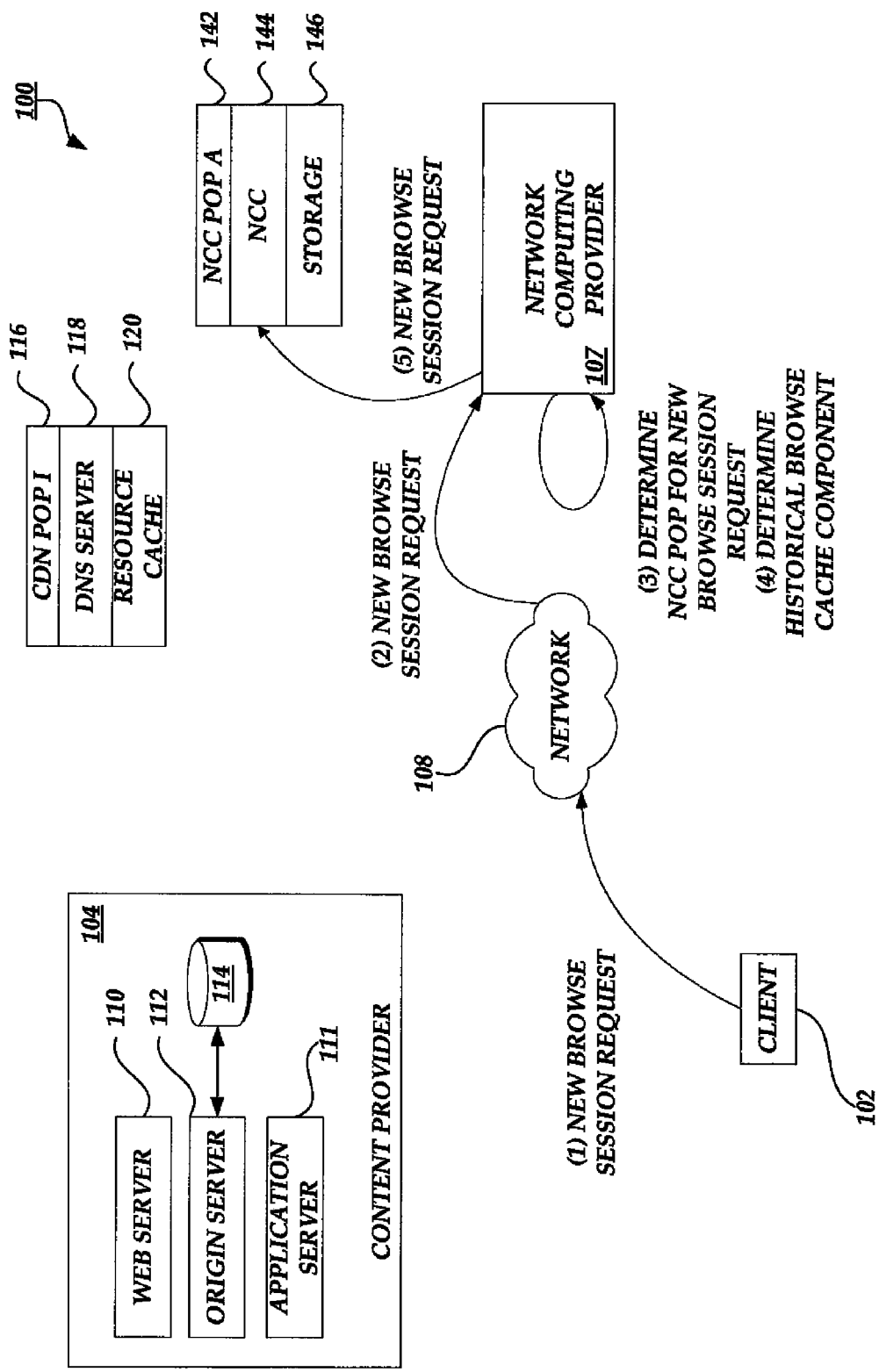
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request may be transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc. The browse session request may further include information identifying a user, browser, client computing device 102, and/or any other browsing entity.

Subsequent to the receipt of the browse session request, the network computing provider 107 may select an associated network computing component (hereinafter "NCC") point of presence (hereinafter "POP") such as NCC POP 142 to service the browse session request, and may identify a historical browse storage component based on the identifying information in the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102.

Figure 3:
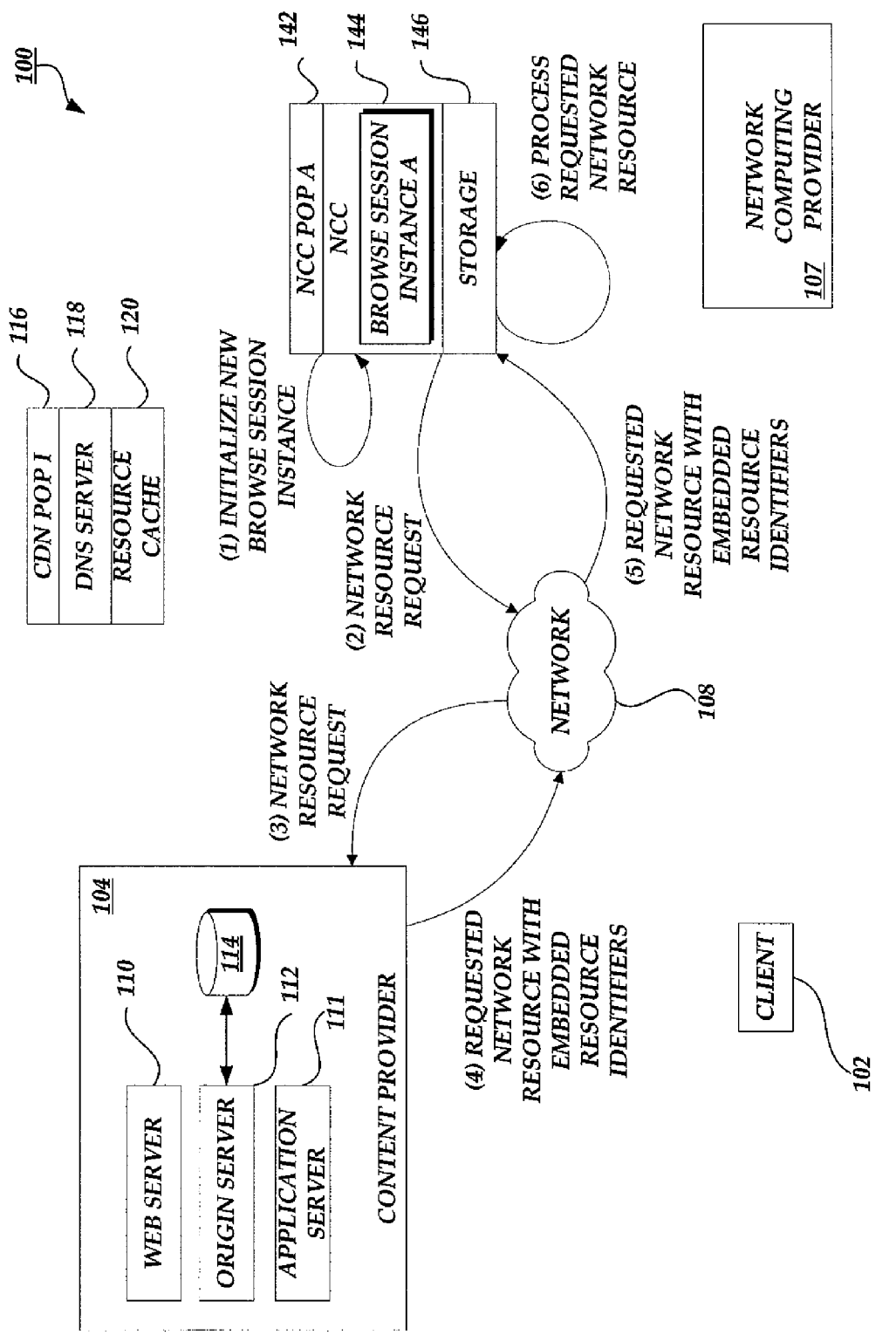
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or data stores associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a client remote session browse configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a client remote session browse configuration as discussed below with reference to FIG. 4.

Figure 4:
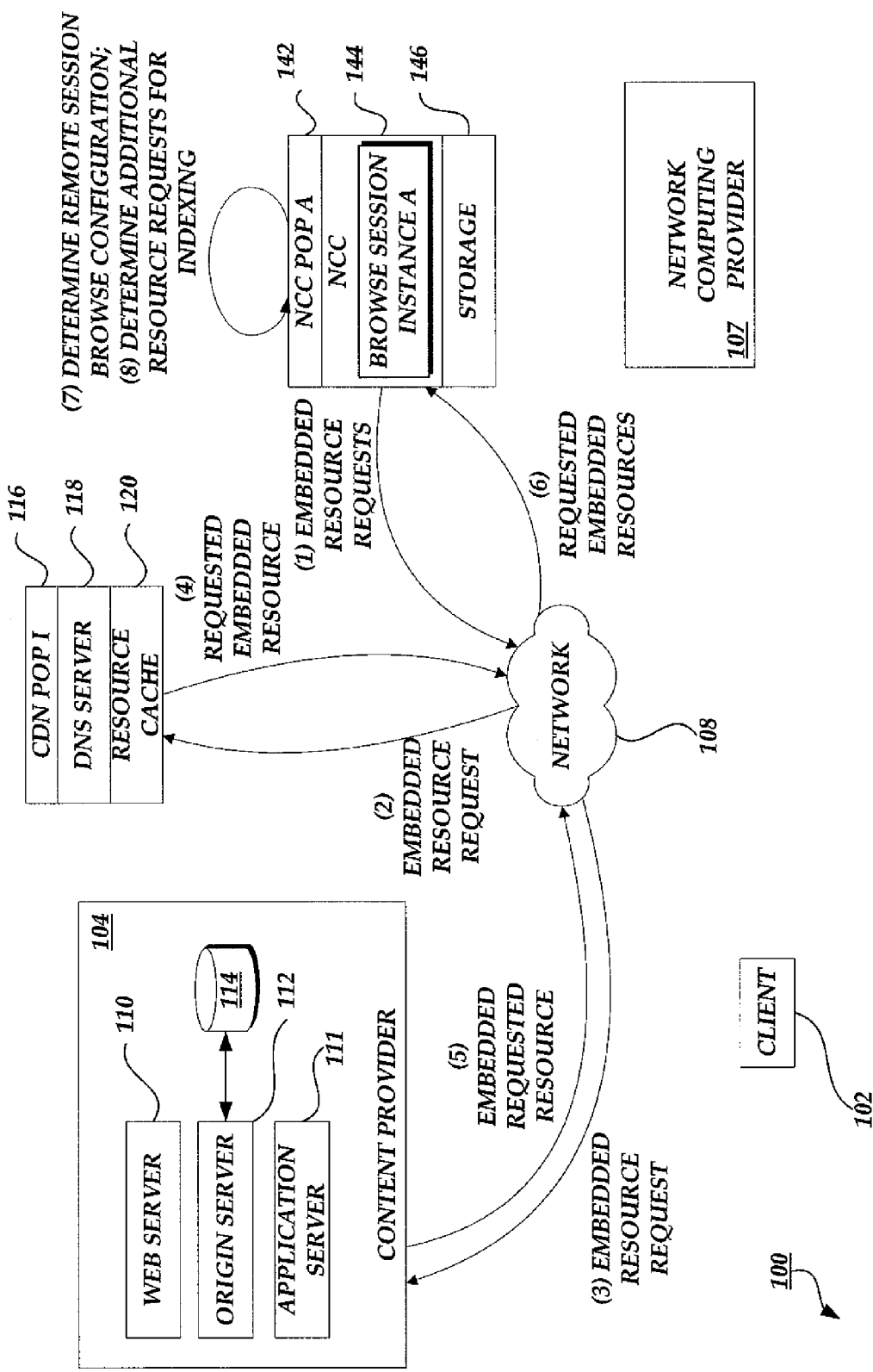
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or data stores associated with the network computing provider 107.

For example, the network computing provider may check if an embedded resource is stored in a local cache or in another data store or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a client remote session browse configuration for the processing and communication of content to the client computing device 102. The NCC POP 142 may further identify references in any of the retrieved content and determine any additional resource requests for retrieval and caching at the historical browse storage component.

Figure 5:
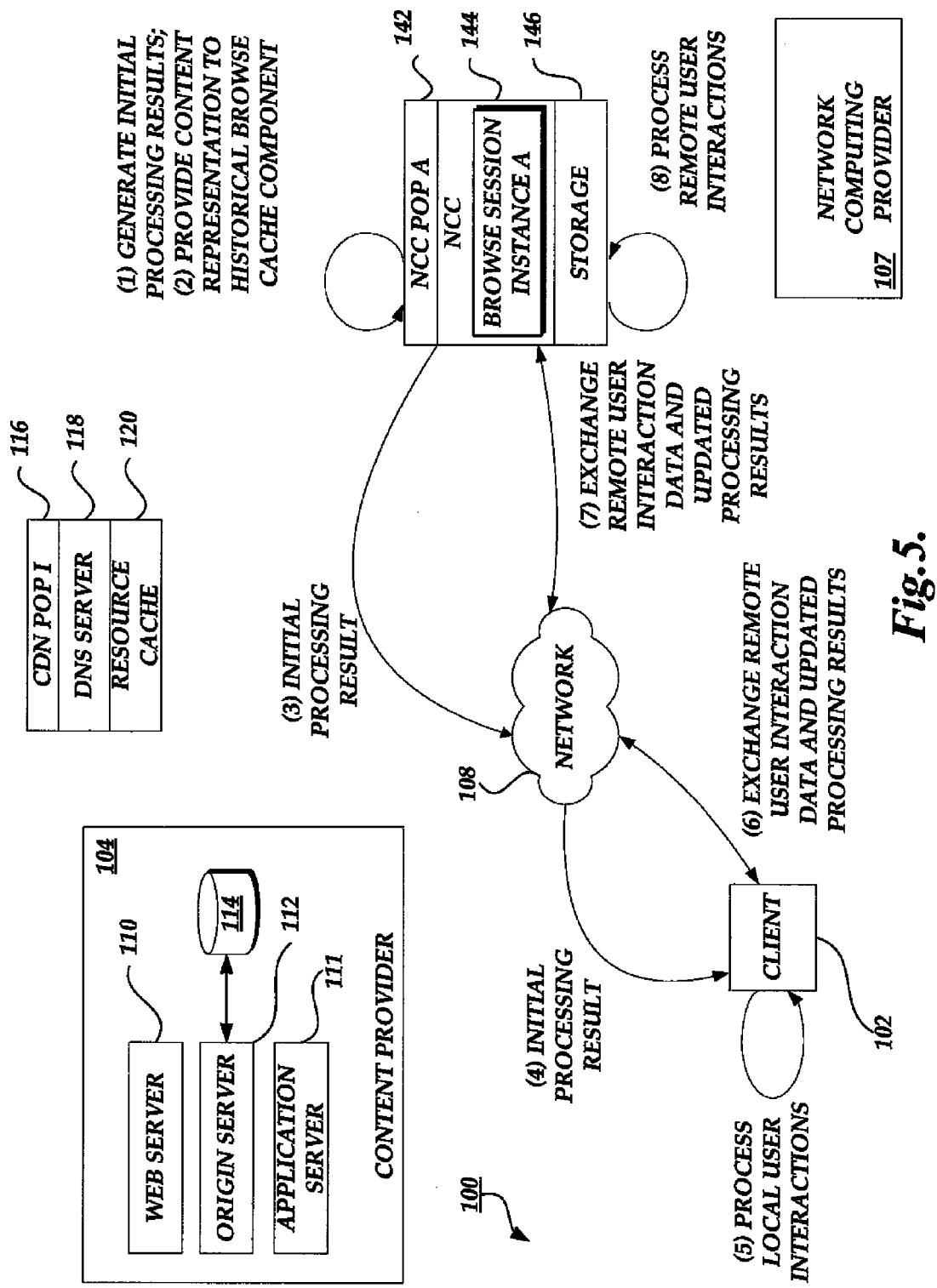
FIG. 5 is a block diagram of the content delivery environment of FIG. 1 illustrating the generation and processing of a historical content representation, browse session data, and user interaction data between a network computing provider and client computing device.

With reference to FIG. 5, an illustrative interaction for generation and processing of a historical content representation, browse session data, and user interaction data between a network computing provider and client computing device is disclosed. As previously described, in one embodiment, the respective browsers on the instantiated network computing component and the client computing device 102 can exchange browsers' session information, such as client remote session browse configuration information, related to the allocation and processing of the requested resources at the instantiated network computing component and client computing device. In one embodiment, a historical browse storage component may be additionally be associated with historical remote session browse configuration information, which may be the same or different as the client remote session browse configuration information discussed above.

As illustrated in FIG. 5, the selected NCC POP 142 may generate initial processing results based on the client and historical remote session browse configuration information as discussed above. If the client and historical remote session browse configuration information each specify different formats and/or processing of processing results, the selected NCC POP 142 may generate two different processing results.

Illustratively, a processing results generated based on the historical remote session browse configuration may be referred to as a historical content representation. The NCC POP 142 may provide the processing results generated according to the historical remote session browse configuration information (i.e., the historical content representation) to the identified historical browse storage component. Illustratively, the historical browse storage component may be implemented over one or more NCC POP of the network computing provider 107, or may include any other network storage location or component.

The selected NCC POP 142 may provide an initial processing result to the client computing device 102 over the network 108. The initial processing result may correspond to requested network content, such as a Web page, along with associated embedded resources processed by the NCC POP 142 in accordance with a selected client remote session browse configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected client remote session browse configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6:
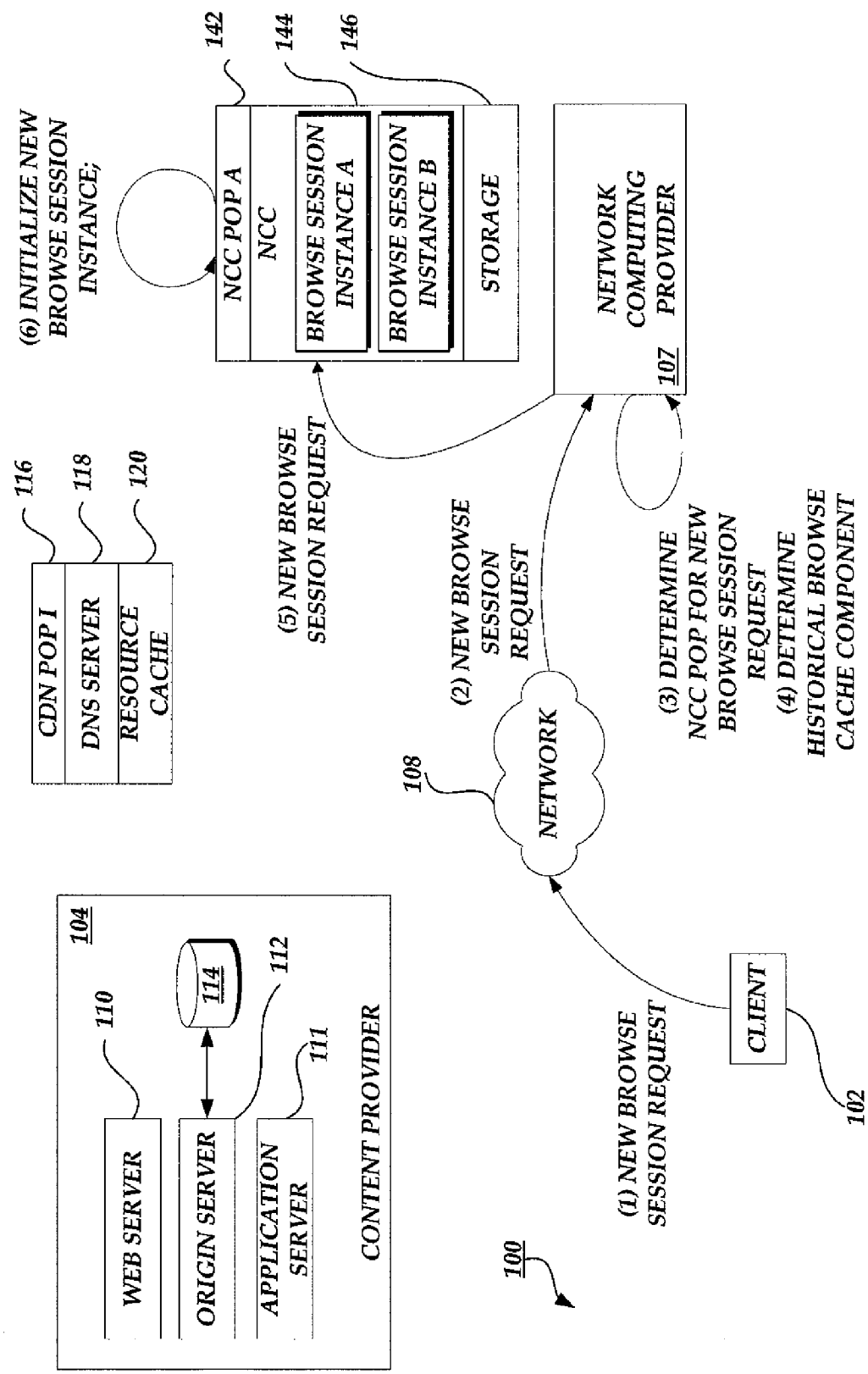
FIG. 6 is a block diagram of the content delivery environment of FIG. 1 illustrating the generation and processing of an additional new browse session request from a client computing device to a network computing provider.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may determine a historical browse storage component based on identification information included in the browse session request and select an associated network computing component such as NCC POP 142 to service the browse session request. As discussed above with reference to FIG. 2, a network computing provider 107 may select an NCC POP to service a browse session request based on any number of factors, including, but not limited to, available NCC POP resources (e.g., available memory, processor load, network load, etc), a financial cost of servicing the browse session request at the NCC POP, the NCC POP location respective to a client computing device 102, content provider 104, or CDN POP 116, an NCC POP cache status (e.g., whether a requested resource is already stored in an NCC POP cache or data store), etc. In one embodiment, the network computing provider 107 may select a number of NCC POPs to service a browse session request. Illustratively, although the network computing provider 107 is depicted here, for purposes of illustration, as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regard to FIG. 2.

Figure 7:
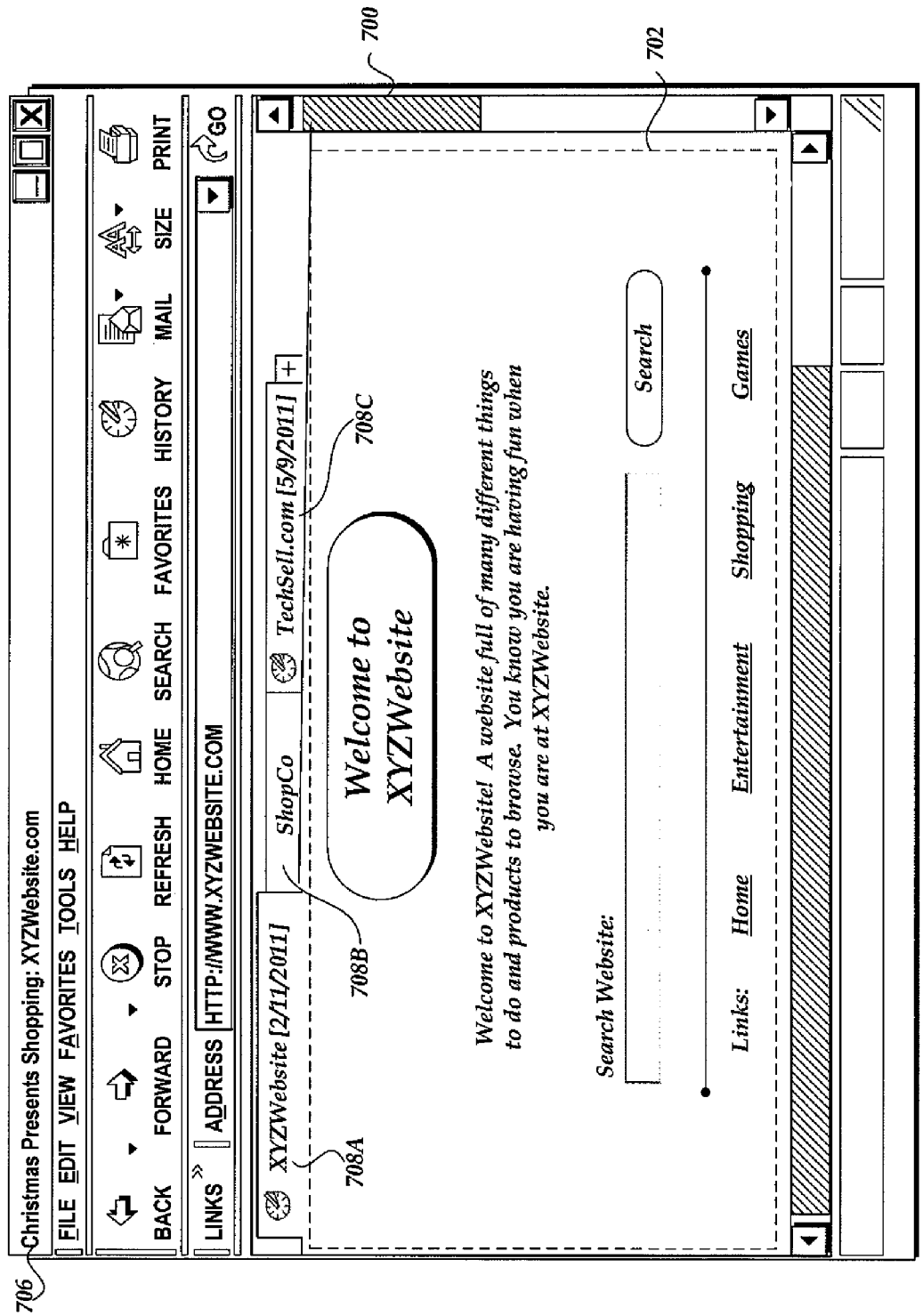
FIG. 7 is a user interface diagram depicting an illustrative browser interface and display of browse session content.

FIG. 7 is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area.

Interactions with local interface components may be treated as local user interactions or remote user interactions depending on the processing required by the interaction and the client remote session browse configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a client remote session browse configuration that specifies extensive processing on the NCC POP 142 (e.g., a client remote session browse configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Illustratively, the browser 700 may include one or more content display areas 702 organized in content tabs 708A-C. Illustratively, a content display area 702 may display a representation of content corresponding to a processing result provided by an NCC POP 142 as the result of a live browsing session, or may display a representation of content corresponding to a historical content representation. Tabs 708A and 708C associated with historical content representations may have one or more indicia that a historical content representation is being viewed, and may further include a date, time, or other associated or identifying information.

Illustratively, a browser 700 may include any number of other controls not shown herein, but associated with the viewing, processing, or maintenance of a historical content representation. For example, a browser 700 may include a control to show the current version of content corresponding to a historical content representation, controls to move back and forward in the historical navigation path, controls to show historical content representations and/or the historical navigation path in a list or tree view such as that shown, for purposes of illustration, in FIGS. 13 and 14. A browser 700 may further include control to allow searching of the historical browse storage component based on a current piece of displayed content or historical content representation as described below with reference to FIG. 15. In various other embodiments, a browser 700 may visually indicate whether resource references (e.g., hyperlinks) within the displayed historical content representation are associated with full historical content representations stored at the historical browse storage component. In a still further embodiment, a browser 700 may visually indicate a level of popularity of a resource reference within a displayed historical content representation based, for example, on a number of other users that followed or continued to browse from the referenced resource.

Figure 8:
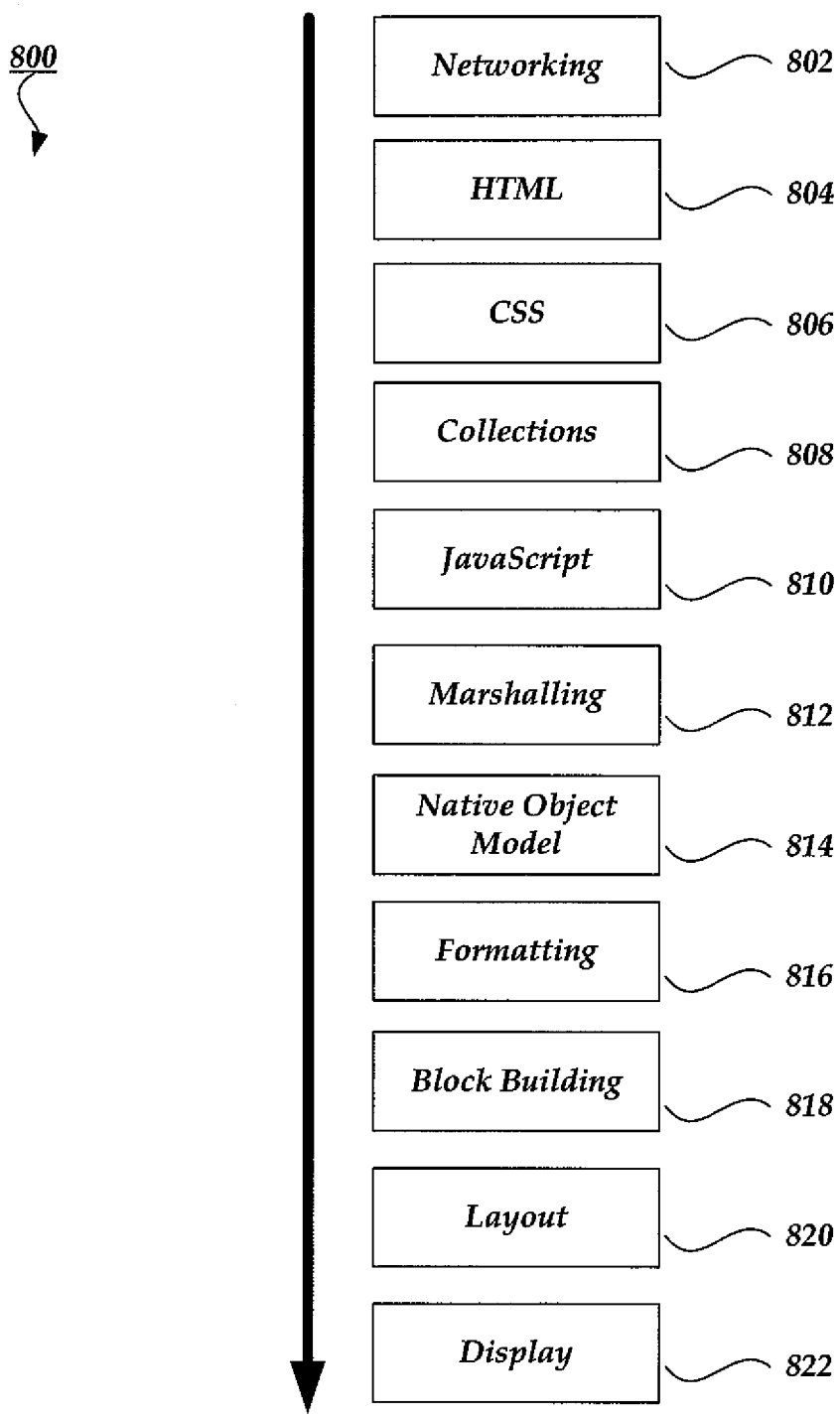
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a client or historical remote session browse configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Illustratively, a single browse session instance may have different or the same client and historical remote session browse configurations. Further, any number of different client or historical remote session browse configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a client or historical remote session browse configuration may implement any number of remote communication protocols for any number of specified processing actions, and that a client or historical remote session browse configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A client or historical remote session browse configuration that splits processing actions at the networking subsystem 802 might include a client or historical remote session browse configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A client or historical remote session browse configuration that splits processing actions at the HTML subsystem 804 might include a client or historical remote session browse configuration utilizing an HTML remote session communication protocol, where an initial HTML page is processed at the NCC POP in order to extract embedded resource identifiers, but additional parsing and processing of the content is performed at the client computing device. In another embodiment, a client or historical remote session browse configuration that splits processing actions at the HTML subsystem 804 might perform initial processing to create the structural representation of the HTML document, and provides a processing result including the structural representation and associated embedded resources.

When CSS is encountered, whether inside an HTML document or an embedded CSS document, it may be passed to a CSS subsystem 806 to parse the style information and create a structural representation that can be referenced later. Illustratively, a remote session browse configuration that splits processing actions at a CSS subsystem 806 may construct a processing result including the CSS structural representation and HTML structural representation, optionally including any associated embedded resources.

HTML documents often contain metadata, for example the information described in a document header or the attributes applied to an element. The collections subsystem 808 may be responsible for storing and accessing this metadata. A client or historical remote session browse configuration that splits processing actions at a collections subsystem 808 may construct a processing result including processed metadata along with any other structural representations discussed above, optionally including any associated embedded resources.

When Javascript is encountered, it may be passed directly to a JavaScript subsystem 810 responsible for executing the script. The JavaScript subsystem 810 has been examined fully over the years, and may be one of the most well known browser subsystems in the art. A client or historical remote session browse configuration that splits processing actions at a Javascript subsystem 810 may construct a processing result including an internal representation of one or more Javascript scripts, including, but not limited to, state data or a representation of the script in a native or intermediate form, as well as any other processed structures or data discussed above, optionally including any associated embedded resources.

Because many JavaScript engines are not directly integrated into the browser, there may be a communication layer including the marshalling subsystem 812 between the browser and the script engine. Passing information through this communication layer may generally be referred to as marshalling. A client or historical remote session browse configuration that splits processing actions at a marshalling subsystem 812 may construct a processing result including marshalling data as well as any other processed structures, scripts, or data discussed above, optionally including any associated embedded resources.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a client or historical remote session browse configuration that splits processing actions at a native object model subsystem 814 may construct a processing result including native object model state data or API calls as well as any other processed structures, scripts, or data discussed above, optionally including any associated embedded resources.

Once the document is constructed, the browser may needs to apply style information before it can be displayed to the user. The formatting subsystem 816 takes the HTML document and applies styles. Illustratively, a client or historical remote session browse configuration that splits processing actions at a formatting subsystem 816 may construct a processing result including an HTML representation with applied styles, as well as any other processed state data, API calls, structures, scripts, or data discussed above, optionally including any associated embedded resources.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A client or historical remote session browse configuration that splits processing actions at a block building subsystem 818 may construct a processing result including block information, as well as any other processed state data, API calls, structures, scripts, or data discussed above, optionally including any associated embedded resources.

Subsequent to the browser styling the content and constructing the blocks, it may go through the process of laying out the content. The layout subsystem 820 is responsible for this algorithmically complex process. Illustratively, a client or historical remote session browse configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A client or historical remote session browse configuration that splits processing actions at the networking subsystem 802 might include a client or historical remote session browse configuration utilizing an RDP remote session communication protocol, where nearly all processing is performed at the NCC POP, and a processing result including bitmap data and low level interface data are passed to the client computing device for display.

Figure 9:
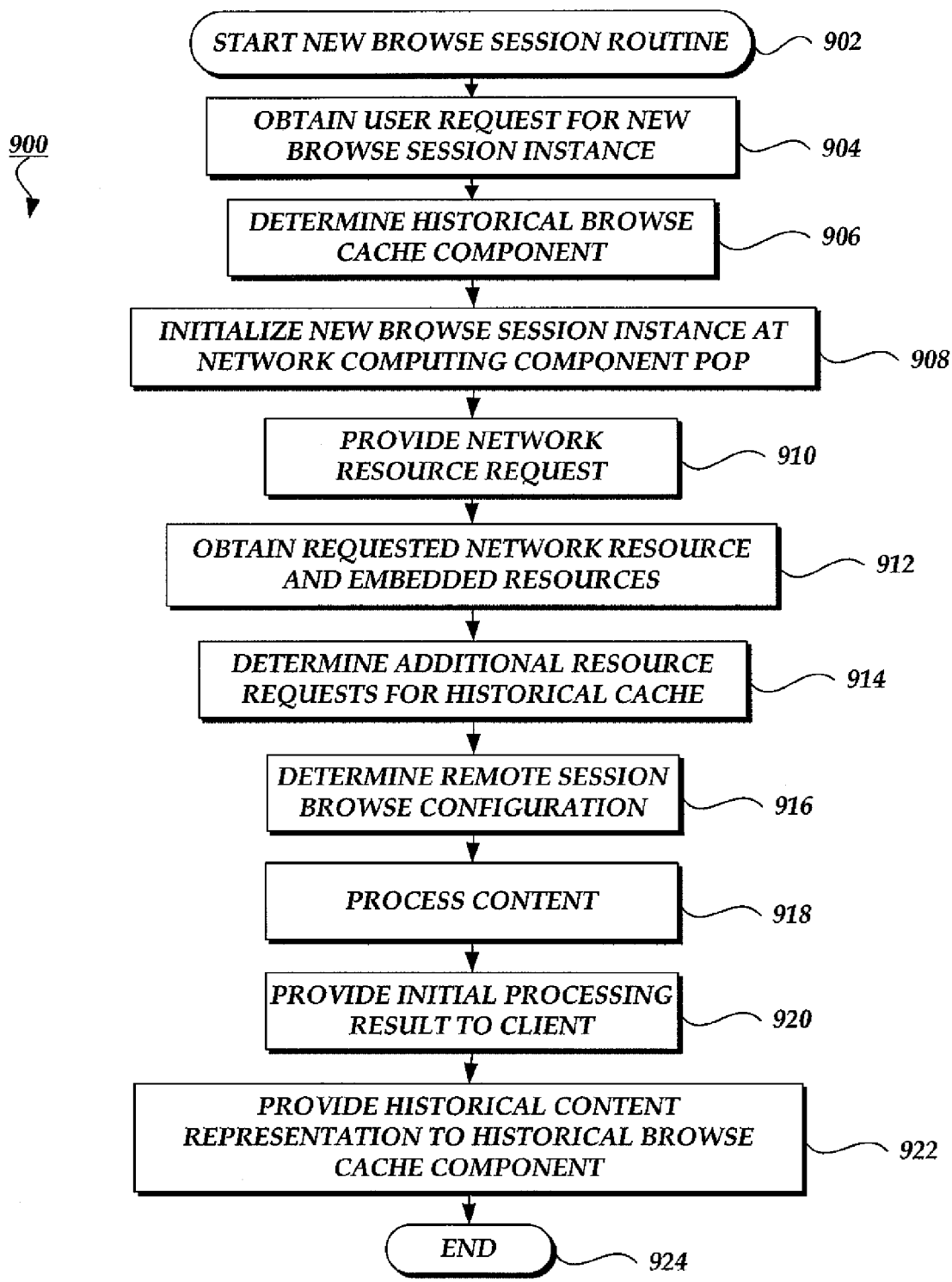
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. The browse session request may further include identifying information including, but not limited to, a user identifier, a browser identifier, a historical cache or data store identifier, a physical or logical location identifier, or a device identifier. In an illustrative embodiment, the browse session request is transmitted in accordance with an API.

At block 906 the network computing provider 107 may identify a historical browse storage component associated with one or more aspects of identifying information included in the browse session request. Illustratively, the historical browse storage component may be associated with the network computing provider 107 (e.g., implemented on one or more NCC POP), or associated or provided by a third party network storage component or data store.

At block 908 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to, available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache or data store), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 910 the network computing provider 107 may provide a request for one or more network resources to a content provider or CDN service provider based on a network address included in the browse session request. In various embodiments, one or more network resources may be additionally or alternately retrieved from a cache or data store local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address.

At block 912, the network computing provider 107 obtains the one or more network resources. Subsequent to obtaining the requested network resource, the NCC POP 142 may process the network resource to extract embedded resource identifiers. The network computing provider 107 may provide resource requests based on the embedded resource identifiers to one or more sources of content such as content providers, CDN service providers, and caches or data stores. The network computing provider 107 may obtain these embedded resources from any number of different sources, sequentially or in parallel.

At block 914, the network computing provider 107 may process the network resources obtained in block 912 above to determine any additional resource requests for the historical browse storage component. In one embodiment, network computing provider 107 may be configured to process network resources directly or indirectly referenced by a requested network resource and provide corresponding historical content representations to a historical browse storage component. An illustrative example of requested and referenced network resources is provided with regards to FIG. 13 below.

For example, a client computing device 102 may provide a request for a new browse session instance corresponding to a Web page. As described above, the network computing provider 107 may retrieve the Web page and associated embedded resources. Illustratively, the Web page may reference any number of other Web pages or other resources through HTML tags embedded in the Web page. For the purposes of the example, the network computing provider 107 may be configured to retrieve all referenced resources up to three levels deep. In this example, the network computing provider 107 may process the requested Web page to extract URLs of referenced Web pages or other resources. The network computing provider 107 may then send requests for the referenced Web pages or other resources. These requested Web pages may be processed, and historical content representations corresponding to the requested Web pages may be provided to the historical browse storage component for storage and indexing. The network computing provider 107 may in turn process these referenced Web pages or other resources to determine and request any secondarily referenced Web pages or other resources. Accordingly, historical content representations corresponding to the secondarily requested Web pages may be provided to the historical browse storage component for storage and indexing. The process of requesting referenced resources and processing the requested resources to determine further references to resources may be repeated any number of times. Specifically, with reference to the above example, the network computing provider 107 may follow references in the secondarily referenced Web pages to obtain and cache tertiary referenced Web pages in order to satisfy the three level deep setting described in the example.

The determination of how many levels to follow references may be predetermined by a user, browser, historical browse storage component, network computing provider 107, or other entity or device. In another embodiment, the determination of how many levels to follow references may be dynamically determined based on a characteristic associated with a requested resource, a time of day or date, a level of interest or importance assigned to the remote session, or any other factor.

In one embodiment, the network computing provider 107 may cause the instantiation additional browse sessions to request and process referenced resources. Illustratively, these additional browse sessions may instantiate further browse sessions to process secondarily references resources, and so forth, recursively, until the appropriate level of reference retrieval is reached.

Illustratively, in various embodiments, different factors may influence which resources are processed into historical content representations and stored at the historical computing and storage component. For example, a network computing provider 107 may not process and store a resource and/or follow references from a referenced resource based on any number of factors including, but not limited to, a content type of the resource, a tag or other metadata associated with the resource, a text term appearing within the resource, a popularity of a resource based on the preferences of other users browsing via the network computing provider 107, etc. In one embodiment, a network computing provider 107 may ignore previously encountered network resources or circular references when obtaining referenced network resource. In other embodiments, the historical browse storage component may retrieve referenced network resources in addition to or as an alternative to the network computing provider 107.

In one embodiment, the network computing provider 107 may only retrieve and/or process limited aspects of resources past a determined or specified depth threshold of references. For example, after following two levels of references, a network computing provider 107 may only request, process, and/or provide a corresponding historical content representation to the historical browse storage component for html and other textual content, and not include any representations of images or other embedded resources. Illustratively, a network computing provider 107 may be configured with any number of thresholds corresponding to limited content requests, processing and/or storage. Further, the network computing provider 107 may limit requests, processing, and/or storage to any number of different aspects of retrieved content including, but not limited to, html, text, metadata, URLs or references, or any other category or type of content, information, or characteristic of a resource.

At block 916, the network computing provider 107 may process the one or more network resources and associated embedded resources to determine a client remote session browse configuration for the processing and communication of content to the client computing device 102. Illustratively, a historical remote session browse configuration may additionally be determined by the network computing provider as described here, or may be predefined for a network computing provider, user, browser, historical browse storage component, or other entity. As discussed above, a historical remote session browse configuration and a client remote session browse configuration may be the same or different in any aspect. A non-specific client and/or historical remote session browse configuration may be described herein as a generic "remote session browse configuration" and any discussion thereof may relate to either a historical remote session browse configuration or a client remote session browse configuration.

Illustratively, a remote session browse configuration may include any proprietary or public remote protocol allowing exchange of data and user interactions or requests between a client and a remote server. The remote session browse configuration may illustratively include both a remote session communication protocol and a processing schema for providing processed (or unprocessed) content to a client computing device for display in the content display area of a browser.

In one embodiment, a remote session browse configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resource references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browse configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browse configuration may specify that various of the processing actions required for display of a piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol, such as RDP, that transmits a processing result including low level interface information and bitmaps to the client computing device 142 for display may be associated with a remote session browse configuration that specifies performing all, or nearly all, of the necessary content processing actions at the NCC POP 142. While using RDP, the NCC POP 142 may, for example, run a full instance of a browser at the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, JavaScript, or data objects involved in the display of an illustrative piece of network content. As another example, a remote session browse configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browse configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device 102 or a content provider, computing or network resource costs (e.g., a financial cost of processing or bandwidth, resource usage, etc.), predetermined preferences or selection information, any additional processing overhead required by a particular remote session browse configuration, a cache status (e.g., whether a particular resources is cached or stored at a NCC POP 142, at the client computing device 102, or at other network storage associated with the network computing provider), a predicted delay or time required to retrieve requested network content, a preferred content provider or agreements with a content provider for a particular remote session browse configuration or level of service, a remote session browse configuration being used for another (or the current) browse session by the same user, or any other factor.

In some embodiments, an NCC POP 142 may base a determination of a remote session browse configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browse configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browse configuration that emphasizes video performance at the client computing device 102. Illustratively, past historical analysis and future predictions may be considered as one or more of a number of factors on which to base the remote session browse configuration determination process, or may be definitive in the decision making process. For example, once an NCC POP 142 determines a remote session browse configuration for a particular content provider, it may skip the remote session browse configuration determination process for any future resources served from the content provider. Illustratively, the NCC POP 142 may re-determine a remote session browse configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browse configuration utilizing a remote session communication protocol such as RDP may specify extensive processing to occur at the network computing provider 107 (e.g., at NCC POP 142) rather than at the client computing device 102. The remote session browse configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browse configuration that performs a substantial amount of processing at the network computing provider 107 and utilizes RDP or a similar remote session communication protocol for communication of processing-intensive content. Conversely, a remote session browse configuration that utilizes a remote session communication protocol, such as HTML, may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may exhibit better performance when performing the majority of processing locally and utilizing HTML rather than RDP as a remote session communication protocol. A remote session browse configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browse configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browse configuration that requires very little processing by the client computing device, for example, using RDP to transmit NCC POP 142 processed results. Conversely, an NCC POP 142 providing an extremely interactive Web page may elect to use a remote session browse configuration that allows the client computing device 102 to handle user interactions locally in order to preserve interface responsiveness, for example, using HTML to transmit substantially unprocessed data. As a still further example, an NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences into account when determining a remote session browse configuration. For example, a user worried about initial page load times may prefer to use a remote session browse configuration heavy on remote processing and utilizing an RDP remote session communications protocol, while a user wishing to maintain an extremely responsive interface may prefer using a remote session browse configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browse configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browse configuration for a set of network content. For example, the NCC POP 142 may select a single remote session browse configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browse configurations for one or more resources in a set of network content. For example, a network resource such as a Web page may reference processing intensive embedded JavaScript or CSS resources, as well as embedded video resources. The NCC POP 142 may select a first remote session browse configuration for the Web page and all embedded resources, excluding the embedded video resource, and a second remote session browse configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browse configurations may be selected to correspond to any number of resources or objects included in a set of network content, regardless of whether resources or objects are obtained from a content provider 104 or CDN service provider 106 in one or more logical files or data structures.

Although the selection of a remote session browse configuration is illustratively depicted herein as occurring after all network resources and associated embedded content have been obtained by the NCC POP 142, one skilled in the relevant art will appreciate that the selection of a remote session browse configuration may be performed at any time. For example, the NCC POP 142 may select a remote session browse configuration after receiving a new browse session request or related information from the client computing device, may select a remote session browse configuration after obtaining a network resource, but before obtaining any associated embedded resources, or at any other time. In some embodiments, the NCC POP 142 may switch to a new remote session browse configuration at some time subsequent to the client computing device 102 obtaining an initial processing result. Illustratively, the NCC POP 142 selecting a new remote session browse configuration may occur automatically after a certain time period or event or in response to a change in network conditions, NCC POP 142 or client computing device 102 load or computing resources, or any other factor described above as potentially influencing the choice of remote session browse configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache or storage components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, cache, or data store in response to the browse session request. The unprocessed content provided by the NCC POP 142 may include all the content associated with the browse session request or may supplement content existing in a cache or data store of the client computing device, retrieved from a content provider or CDN, or obtained from some other source. In one embodiment, a client computing device 102 may obtain all requested content from a local cache or data store, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browse configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing of all requested resources, the browser may process any user interactions locally and/or remotely as described in FIGS. 5 and 11.

Once the local browse session has fully obtained and processed resources corresponding to the requested content, the computing device 102 may determine whether to continue to display results obtained from the NCC POP 142 (and process user interactions at the NCC POP 142) using the determined remote session browse configuration, or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browse configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regard to determining a remote session browse protocol above.

In another embodiment, the client computing device 102 may continue to process and display updated processing results from the NCC POP 142 even after the local browse session has fully loaded the requested content. The client computing device 102 may terminate the local browse session or may run the local browse session in parallel as a backup process, in the converse of the example provided above. It should be appreciated that although the local browse session is described here, for the purpose of illustration, as being slower to load than the remote browse session instance, in some embodiments the local browse session may load the content faster than the remote browsing session, in which case the browser may process user interactions locally until the remote browse process has fully loaded the requested content.

In some embodiments, the client computing device 102 may display and process user interactions through whichever browse session, local or remote, loads the requested content first.

In various other embodiments, the network computing provider 107 may instantiate multiple remote browse session instances to run in parallel in addition to, or as an alternative to, instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol, as well as a browse session instance running on a second NCC POP utilizing an X-Windows protocol. The client computing device 102 or the network computing provider 107 may determine which browse session instance and protocol should be used based on performance or resource usage considerations as described with regard to determining a remote session browse protocol above.

With continued reference to FIG. 9, at block 918, the network computing provider 107 may process the obtained content, including the one or more requested network resources and embedded network resources, according to the client determined remote session browse configuration to generate an initial processing result. The network computing provider 107 may further process the obtained content, including the one or more requested network resources and embedded network resources according to the determined historical remote session browse configuration to generate an initial processing result corresponding to a historical content representation. In one embodiment, the network computing provider 107 may only process the obtained content one time. For example, the network computing provider 107 may perform processing steps specified by the client remote session browse configuration to obtain a first processing result, and then may perform any remain processing steps to obtain the historical content representation, or vice versa.

In one embodiment, the historical content representation may include additional information, including, but not limited to, information associated with the network resource request, the network resource, content associated with the network resource, the client computing device 102, a user, the network computing provider 107 or any other entity, content, or component. In one embodiment, the historical content representation may include information associated with a position on a browsing or navigation path as described below with reference to FIG. 13. For example, a second historical content representation may include information specifying that the client computing device followed a reference from a first network resource (e.g., corresponding to a first historical content representation) to get to a network resource corresponding to the second historical content representation.

In further embodiments, the historical content representation may include any number of types of information including, but not limited to: an amount of time spent viewing or interacting with content corresponding to the historical content representation; notes, markups, or other user generated content or information associated with the historical content representation; resource usage or performance metrics associated with processing of the content corresponding to the historical content representation at a network computing provider 107 or client computing device 102; a latency or other network performance metric associated with the transmission of the content corresponding to the historical content representation; a physical or logical location associated with the request for the network resource; an identifier associated with the content corresponding to the historical content representation; advertisements associated with the content corresponding to the historical content representation; and/or any other type of information. For example, in one embodiment, a user may be provided with an interface for adding notes to a Web page. Illustratively, these notes may be stored with or included within the historical content representation of the Web page, along with any other type of information associated with the Web page as discussed above.

At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10.

In one embodiment, the network computing provider 107 may determine whether to refrain from processing content to generate a historical content representation and/or providing the processed historical content representation to the historical browse storage component based on any number of factors. Illustratively, the network computing provider 107 may refrain from processing and/or storing a historical content representation based on factors including, without limitation, any of the factors discussed above with reference to determining a remote browse session configuration as discussed in block 916, etc. For example, the network computing provider 107 may refrain from storing historical content representations corresponding to a particular Web site or domain on a network. In another example, the network computing provider 107 may refrain from storing historical content representations associated with secure or sensitive information associated with a user of the client computing device 102. In a further embodiment, the determination of whether to process or store a historical content representation may be made by a historical content filter component or service associated with the network computing provider 107, the historical browse storage component, or any other third party.

At block 922, the network computing provider 107 may provide the historical content representation to the historical browse storage component. Illustratively, the historical browse storage component may be configured to store the historical content representation according to any system or process known in the art, and may further incorporate any type of data protection, mirroring, caching, etc., as known in the art. A historical content representation may be based on a network resource as retrieved, or may be based on a network resource with any of various aspects of state data relating to a users interaction with the retrieved network resource. At block 922, the start new browse session routine 900 ends.

Figure 10:
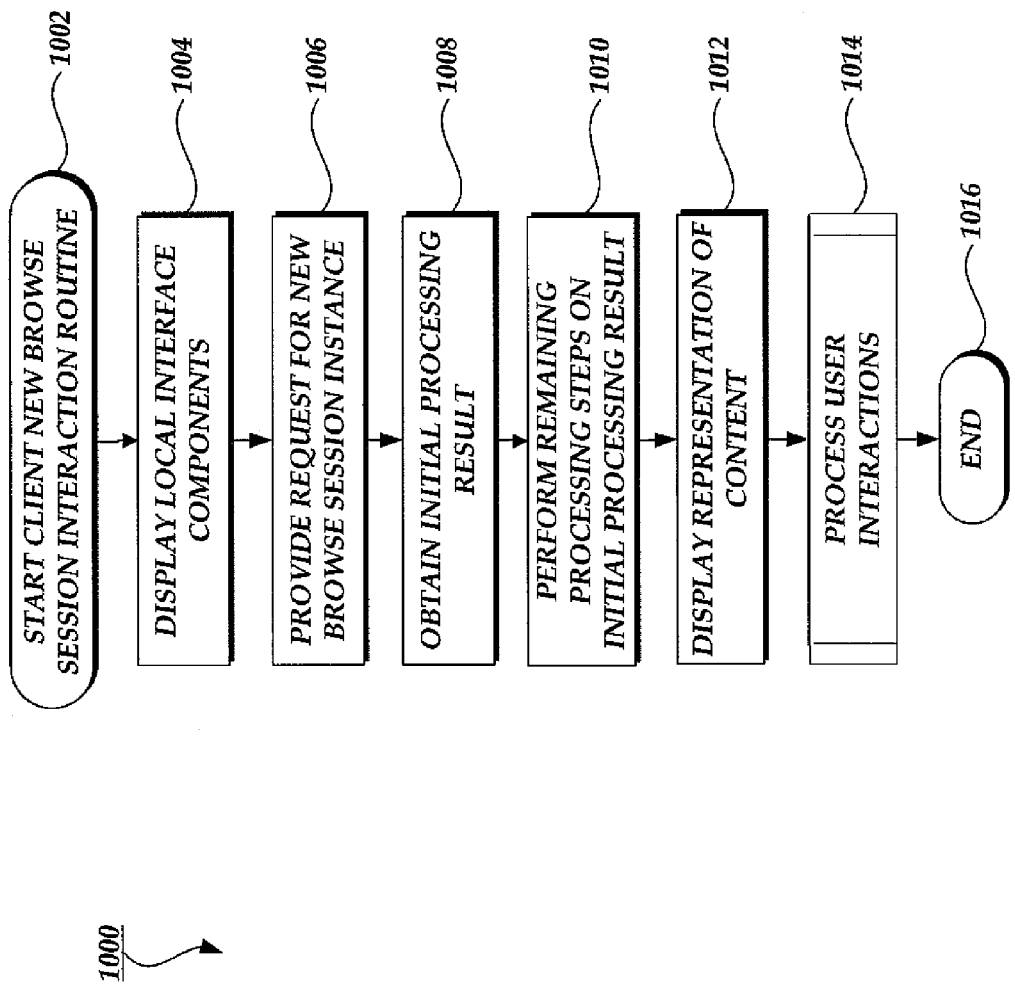
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiments, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request, which may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browse configuration selected by the network computing provider 107. In one embodiment, the initial processing result may include or be preceded by data informing the client computing device 102 of the choice of remote session browse configuration and/or establishing a connection over the remote session communication protocol corresponding to the selected remote session browse configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out, but has associated content still displayed in a browser at the client computing device 102, later attempts by the user to interact with the content may result in a new browse session request being provided to the network computing provider 107 to start a new browse session according to the last state of the terminated session. Illustratively, terminating a remote browse session after a time-out may allow the network computing provider 107 to save computing resources at the NCC POP. In one embodiment, this process may be transparent to the user at client computing device 102, even though the remote browse session has been terminated during the intervening period.

Figure 11:
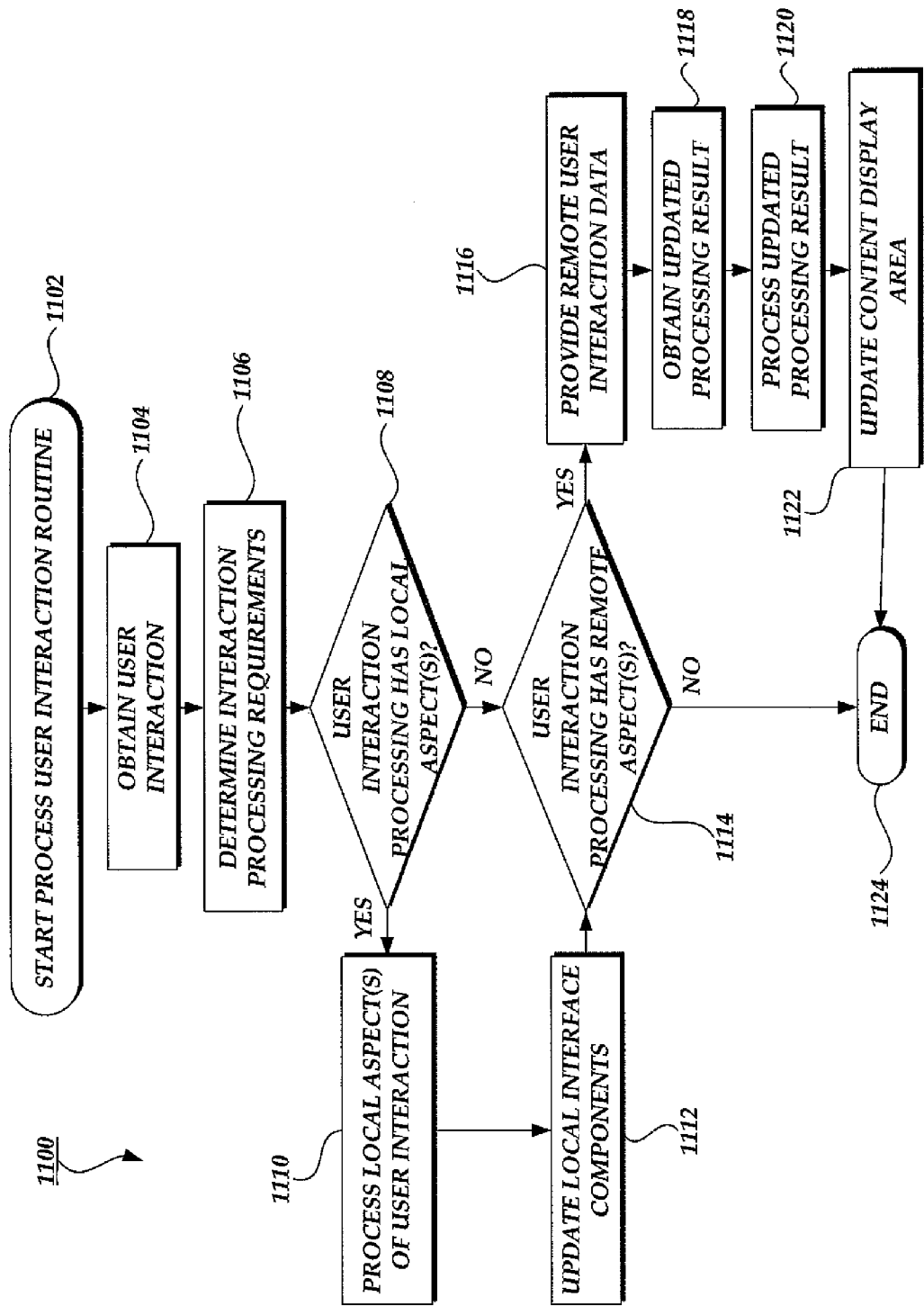
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102, or as a remote user interaction at the NCC POP 142, depending on the remote session browse configuration in use. For example, if a remote session browse configuration utilizing substantial local processing (e.g., sending unprocessed files over HTML) is utilized, user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browse configuration utilizing heavy remote processing of content (e.g., sending processed bitmap data over RDP) is being used as the remote session browse configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browse configuration, as further depicted in illustrative FIG. 7. For example, some local interface components may be managed locally by browser code running on the client computing device, while other local interface components may have one or more locally managed aspects (e.g., button click feedback, scroll bar redraw, etc), and one or more remotely managed aspects treated as remote user interactions (e.g., page refresh, requesting a page at an address in an address bar, etc.).

At block 1104, the client computing device 102 obtains a user interaction from the user. This user interaction may be an interaction with local interface components as described above and with reference to FIG. 7, or may be an interaction with any interactive elements of the content displayed in the content display area of the browser, such as form fields, buttons, animations, etc. User interaction with these local interface components or interactive elements of displayed content may require local and/or remote processing, depending on the nature of the component or element and the processing split specified by the remote session browse configuration as described above and with reference to FIG. 7. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.), the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browse configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browse configuration utilizing an RDP remote session communication protocol, the remote user interaction data may include input data such as a cursor position or keyboard input encapsulated in one or more RDP protocol data units. In some embodiments of remote session browse configurations utilizing RDP or other remote session communication protocols, particular aspects of remote user interaction data, such as cursor positions, may be provided to the network computing provider 107 on a continuous basis, while in other embodiments of remote session browse configurations, remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browse configuration), and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
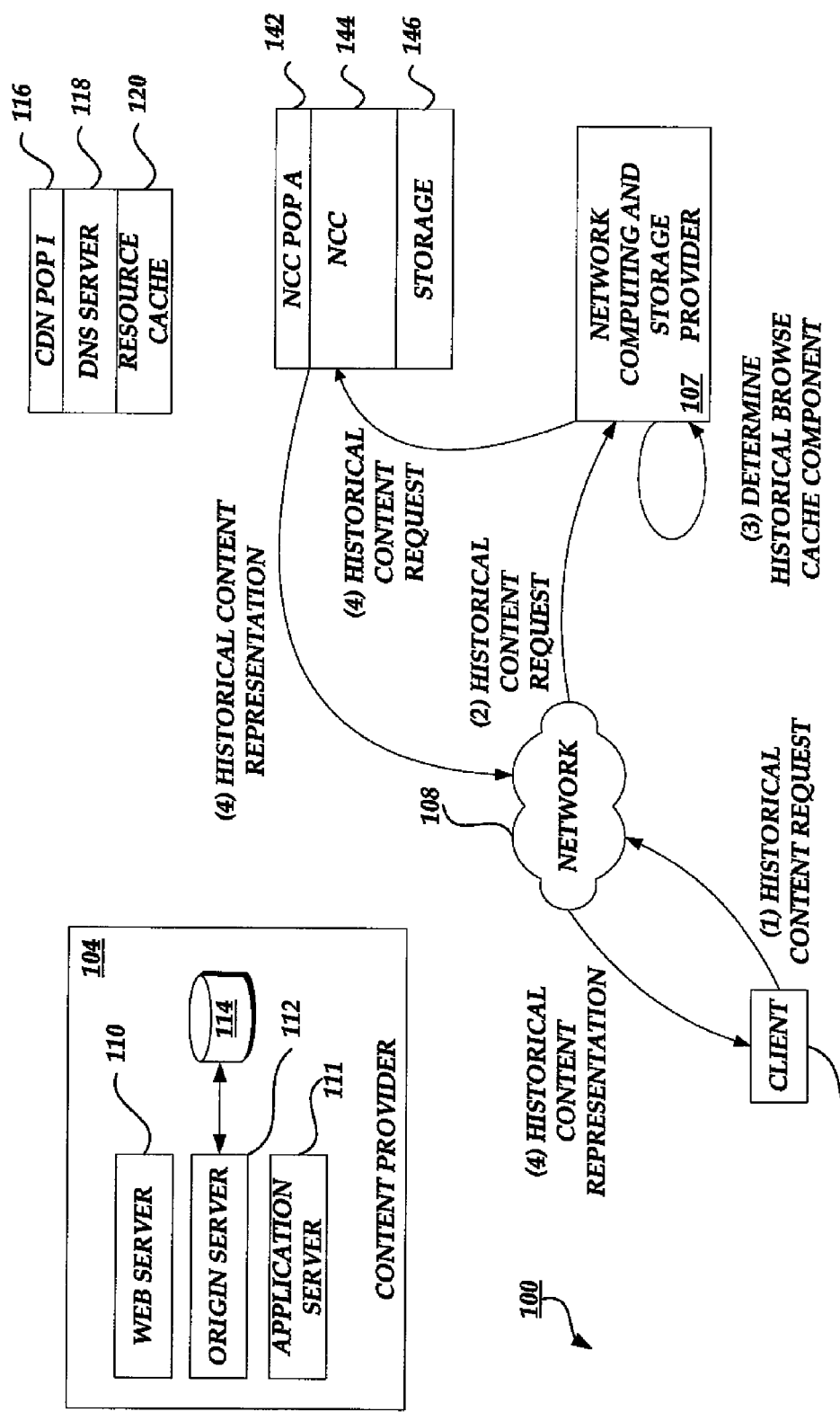
FIG. 12 is a block diagram of the content delivery environment of FIG. 1 illustrating the generation and processing of a new historical content request from a client computing device to a network computing provider.

With reference to FIG. 12, a block diagram of the content delivery environment of FIG. 1 illustrating the generation and processing of a new historical content request from a client computing device 102 to a network computing provider 107 will be described. The process can begin with the generation and processing of a historical content request from a client computing device 102 to a network computing provider 107. Illustratively, this request may be generated automatically as a result of a search for historical content, as described with reference to FIG. 15 below, or may be generated as a result of a user following a reference to a piece of historical content, selecting historical content from a list or tree diagram, or in response to any other user interaction or system or browser request. For example, in one embodiment a first user may provide a reference such as an identifier or network address information corresponding to a historical content representation to a second user at a client computing device 102. Illustratively, the historical content representation may correspond to a Web page or other network resource previously accessed or viewed by the first user. With regards to this example, the client computing device 102 may process the reference to generate a historical content request.

Returning to FIG. 12, subsequent to the client computing device 102 generating or obtaining a historical content request, the historical content request may be transmitted first to a network computing provider 107. In an illustrative embodiment, the network computing provider 107 utilizes a registration application program interface ("API") to accept historical content requests from the client computing device 102. The historical content request can include an identifier or network address information corresponding to a historical content representation, which may be in any form, including, but not limited to, an alphanumeric code consisting of any combination of characters, an Internet Protocol ("IP") address, a URL, a Media Access Control ("MAC") address, etc. The historical content request may further include information identifying a user, browser, client computing device 102, and/or any other browsing entity.

Subsequent to the receipt of the browse session request, the network computing provider 107 may identify a historical browse storage component based on any combination of the identifying information and identifier or network address information corresponding to the historical content representation in the browse session request. In one embodiment, the network computing and storage component may process the identifying information or request additional information from the client computing device 102 to determine that the client computing device 102 is authorized to request the historical content representation.

Illustratively, and for the purposes of example with regard to FIG. 12, we may assume that the network computing provider identifies a historical browse storage component implemented at a NCC POP 142. As discussed above, a historical browse storage component may, in various embodiments, be implemented, associated, and/or provided by any combination of devices and/or entities. In one embodiment, the NCC POP 142 may provide historical remote session browse configuration information to the client computing device 102 related to the forthcoming transmission and processing of the requested historical content representation.

The NCC POP 142 may provide the requested historical content representation to the client computing device on the basis of the historical remote session browse configuration information. The historical content representation may correspond to requested historical content, such as a Web page. In one embodiment, the historical content representation may include representations of any embedded resources associated with the historical content (e.g., embedded content on the requested Web page). In another embodiment, the historical content representation may contain embedded references to other historical content representations associated with embedded content for retrieval by the client computing device 102. Subsequent to receiving the historical content representation, the client computing device 102 may perform any remaining processing actions on the initial processing result as required by the historical remote session browse configuration, and may display the fully processed content in a content display area of a browser.

In another embodiment, a historical content request may correspond to a request to delete or otherwise remove a historical content result. For example, a client computing device 102 may provide a request to delete a historical content result from storage. Illustratively, responsive to the request to delete the historical content result, the network computing and storage provider 107 and/or NCC POP 142 may delete the specified historical content result from one or more data stores and/or delete an association between the client computing device 102 or associated user and the historical content result.

Figure 13:
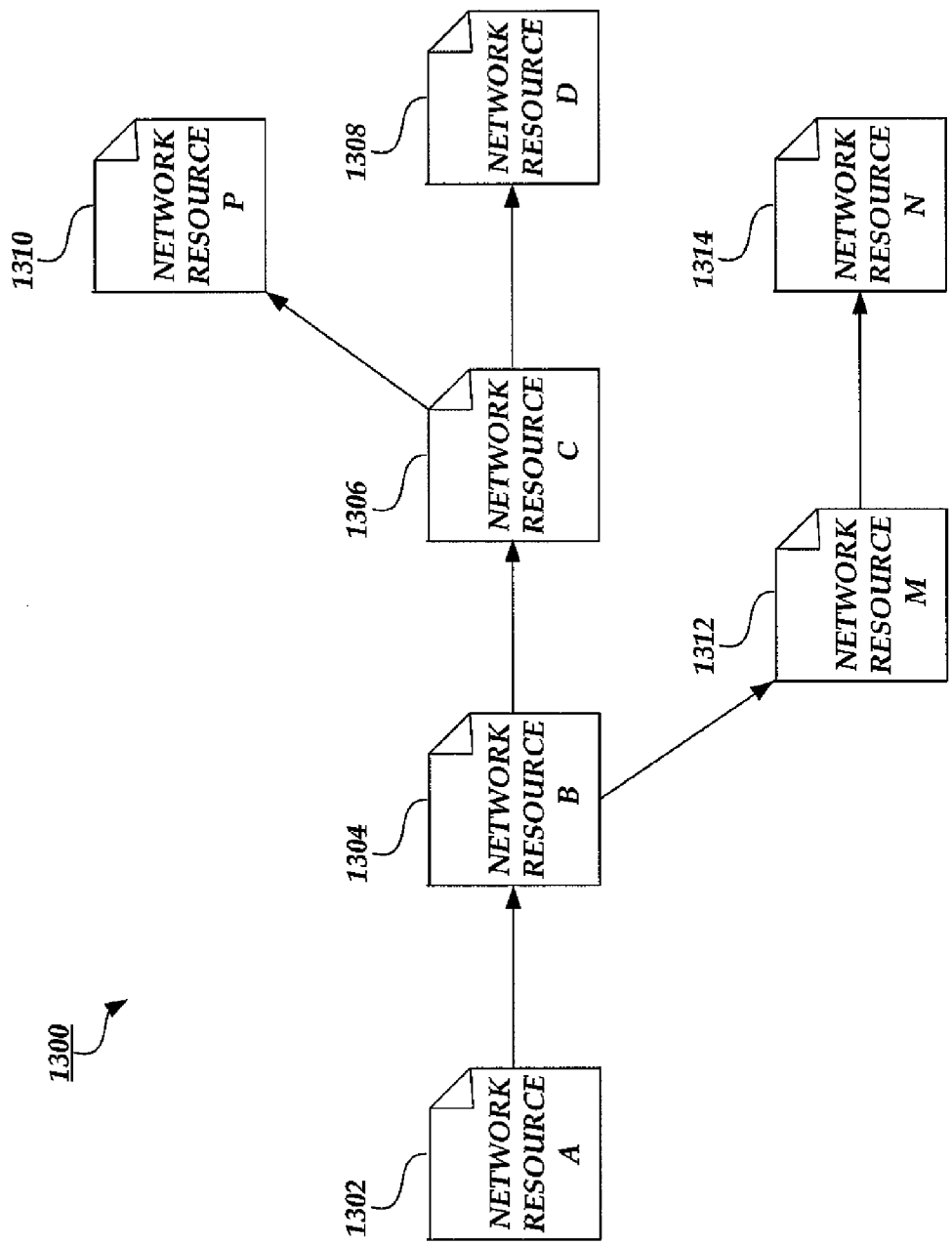
FIG. 13 is a branch diagram illustrative of a network resource navigation path.

With reference to FIG. 13, a branch diagram illustrative of a network resource navigation path 1300 will be described. Illustratively, as described above, a client computing device 102 may obtain and display representations of network content such as network resources 1302-1314. In one embodiment, one or more of network resources 1302-1304 may include one or more references to other network resources. For the purposes of a specific example, network resource 1302 may, in one embodiment, be a Web page with a number of hyperlinks to other Web pages. In one embodiment, a user may follow a reference from a network resource from a browser to obtain a representation of the referenced network resource. As discussed above, each network resource 1302-1314 may be associated with one or more same or different remote browse sessions at the network computing provider 107.

Illustratively, a user may sequentially follow a link in a browser at client computing device 102. For example, a user may click a link at a representation of network resource 1302 that may cause the browser to replace the representation of network resource 1302 in the content display area of the browser with a representation of network resource 1304. In this manner, the user may sequentially browse through network content. Illustratively, we may refer to this chain of references as a browsing path or navigation path. For example, the user may follow a sequential navigation path by viewing a representation of network resource 1302, followed by network resource 1304, followed by 1306, and followed by 1308.

In another embodiment, a user may follow a link in parallel to a sequential navigation path 1302-1308. For example, a user may follow a link on a Web page to open up a new tab, frame, window, or other organizational grouping on a browser at client computing device 102. Accordingly, a user may follow a reference from a network resource 1304 to open a new tab displaying a representation of network resource 1312, and may subsequently sequentially follow a reference to a network resource 1314. As another example, a user may follow a reference from a network resource 1306 to open a new tab displaying a representation of a network resource 1310.

In one embodiment, a historical browse storage component may obtain and store data allowing the recreation of logical browse paths such as the browse path depicted for purposes of illustration in FIG. 13. In one embodiment, references followed to and/or from a piece of content may be stored with a historical content representation corresponding to the content. In another embodiment, a historical browse storage component may independently maintain a reference and/or path associated with a historical navigation path.

Illustratively, a browser at a client computing device 102 may, in one embodiment, have an interface control or function that allows the display of a historical browse path. Illustratively, a historical browse path may be displayed as a branch or tree diagram as depicted here for purposes of illustration, a list, a table, or in any other representation as known in the art. In one embodiment, references between network resources or representations of the network resources themselves may be displayed with visual indications of a type of content, the appearance of one or more search terms, a previously viewed status, a popularity based on the viewing behavior of other users, or any other characteristic or related aspect of information.

Figure 14:
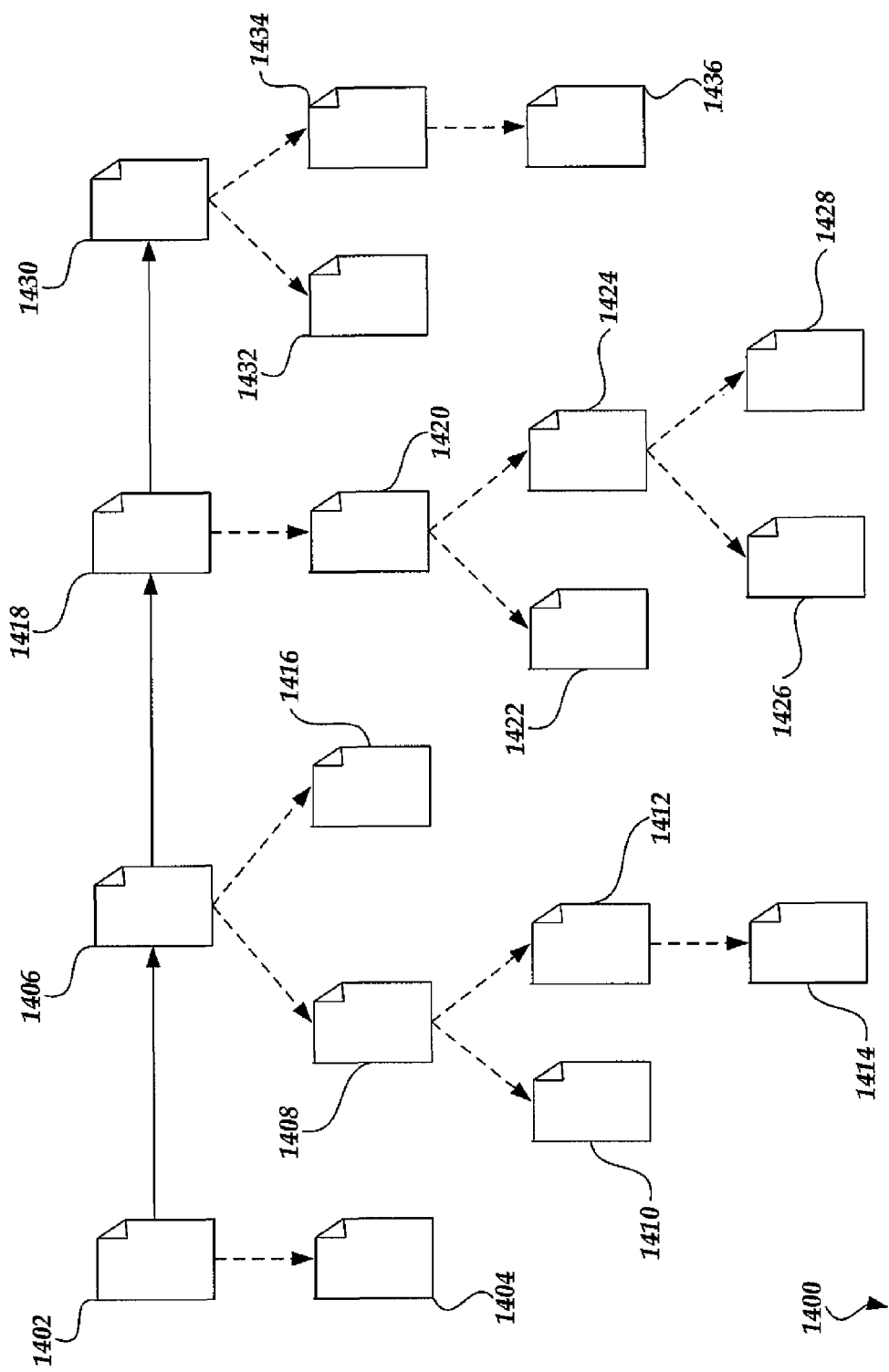
FIG. 14 is a branch diagram illustrative of a network resource navigation path depicting network resource reference levels.

With reference to FIG. 14, a branch diagram illustrative of a network resource navigation path 1400 depicting network resource reference levels will be described. Illustratively, as described above with reference to FIG. 13, a user browsing network content at a client computing device 102 may follow references between network resources in a navigation path. In one embodiment, each network resource may have any number of references to other network resources. As described with reference to FIG. 9, a network computing and storage component 107 or historical browse storage component may be configured to retrieve and store representations of network resources directly or indirectly referenced by a network resource requested by a client computing device 102.

For the purpose of illustration, a user at a browser at client computing device 102 may browse network resources in a browse path from network resource 1402 to network resource 1406 to network resource 1418 to network resource 1430. In one embodiment, representations of each of these network resources 1402, 1406, 1418, and 1430 may be stored and indexed at a historical browse storage component. Each network resource 1402, 1406, 1418, and 1430 may reference any number of other network resources, such as one or more of network resources 1404, 1408, 1416, 1420, 1432, and 1434. Illustratively, network resources 1404, 1408, 1416, 1420, 1432, and 1434, directly referenced by requested network resources 1402, 1406, 1418, and 1430, may be referred to as a first level of references or a first level of referenced network resources. Network resources 1410, 1412, 1422, 1424, and 1436 referenced by the first level of referenced network resources 1404, 1408, 1416, 1420, 1432, and 1434 may be referred to as a second level of references or a second level of referenced network resources. Accordingly, network resources 1414, 1426, and 1428, referenced by the second level of network resources 1410, 1412, 1422, and 1424, may be referred to as a third level of references or a third level of referenced network resources, etc.

In one embodiment, subsequent to having representations of one or more levels of referenced network resources stored at a historical browse storage component, a user at a client computing device 102 may be able to view the representations of one or more levels of the referenced network resources in a browser or application. Illustratively, levels of referenced network resources from a historical browse path may be displayed as a branch or tree diagram, as depicted here for purposes of illustration, a list, a table, or in any other representation as known in the art. In one embodiment, references between network resources or representations of the network resources themselves may be displayed with visual indications of a type of content, the appearance of one or more search terms, a previously viewed status, a popularity based on the viewing behavior of other users, or any other characteristic or related aspect of information.

Figure 15:
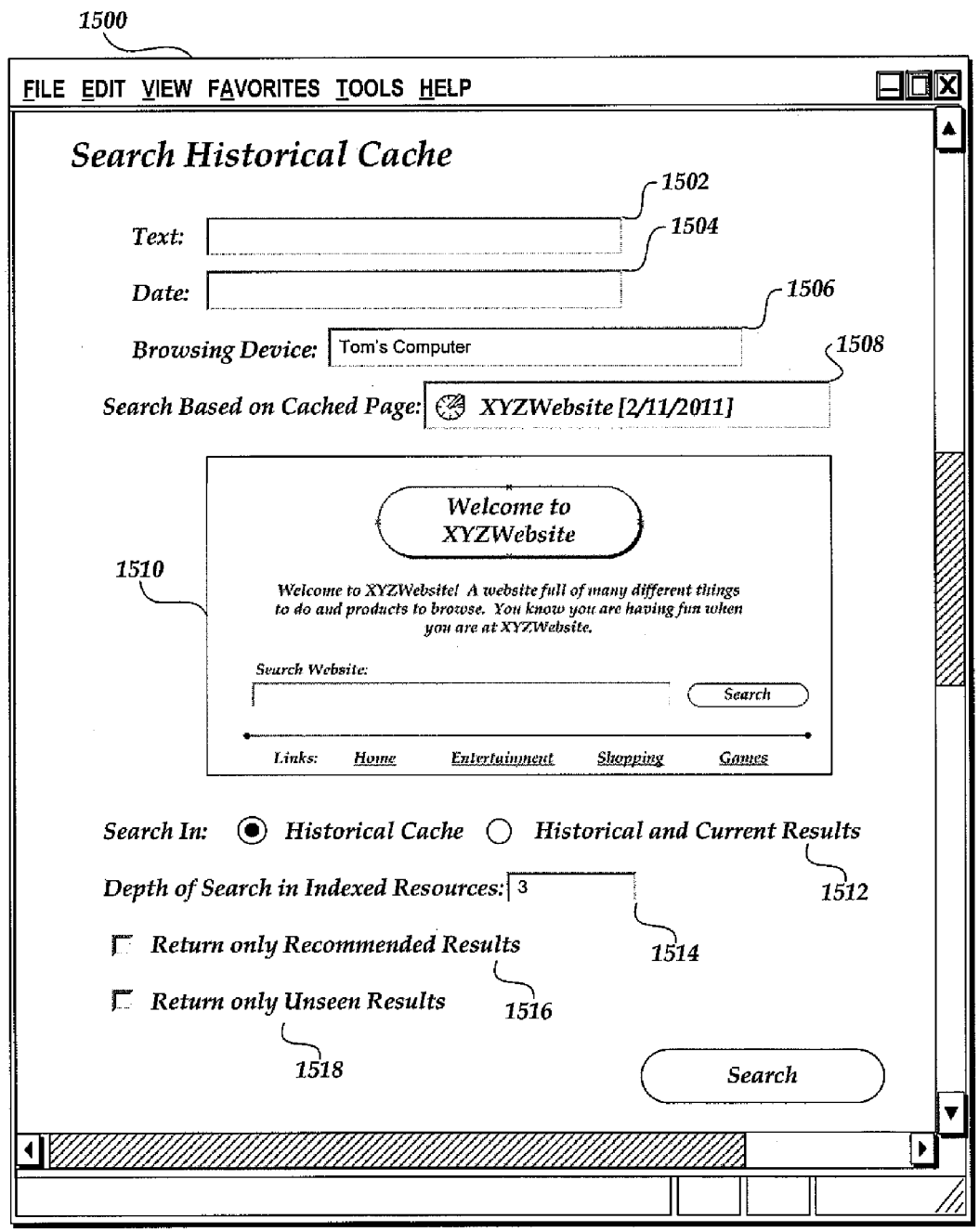
FIG. 15 is a user interface diagram depicting an illustrative historical browse search interface.

With regard to FIG. 15, a user interface diagram depicting an illustrative historical browse search interface 1500 is described. In one embodiment, the search interface 1500 may be accessible from a browser running on client computing device 102, or any other application or service. Various aspects of functionality corresponding to the search interface 1500 may be provided by any number of different software applications, network components, and/or service providers through one or more interfaces, APIs, browser plugins, or other means of access. In one embodiment, the search interface 1500 may allow a user to search for historical content representations stored at a historical browse storage component and corresponding to past viewed and/or referenced network resources.

Illustrative search interface 1500 may include fields for searching any number of characteristics of stored historical content representations or corresponding network resources. Fields for searching characteristics of stored historical content representations may include, but are not limited to, a text search field 1502, and a date search field 1504. In various other embodiments, the search interface 1500 may further include means (not shown) for searching based on any combination of content type, specific browse session, software browser, user, metadata, tags, or any other characteristic associated with a network resource.

The illustrative search interface 1500 may include a browsing device search field 1506 for specifying a client computing device originally used to view the network resource. For example, a user may originally have viewed and/or requested a network resource on his home computer. The user may subsequently search for a historical content representation of the network resource filtering the results by content that he originally viewed on his home computer. Illustratively, a client computing device may be identified in any number of ways as known in the art, including, but not limited to, identification by a MAC ID or IP address, a serial number, a browser cookie, and/or any number of identifiers associated with client computing device hardware or software. In one embodiment, one or more alternate identifiers (e.g., descriptions, names, icons, etc.) may be associated with one or more devices in order to allow a user to easily specify a particular device.

The illustrative search interface 1500 may further include a location search field 1508 for specifying a location at which a network resource was originally viewed or requested. In various embodiments, the location search field may allow a user to enter a physical or logical location. Illustratively, search results may be filtered for content that was originally viewed at the specified location. In one embodiment, one or more alternate identifiers (e.g., descriptions, names, icons, etc.) may be associated with one or more physical or logical locations in order to allow a user to easily specify a particular location. In other embodiments, a user may enter any number of other location identifiers, including, but not limited to, Global Positioning System (GPS) coordinates, latitude and longitude, address, IP address, network domain, etc.

Illustrative search interface 1500 may further include a control 1510 for searching based on a specific historical content representation or network resource. For example, in one embodiment, a user may right-click on a historical content representation or a representation of a network resource displayed in a browser and select a search based on page option. Illustratively, identifying information for the network resource provided in the control 1510 may be accompanied by a network resource preview 1514 or other representation of the network resource in the search interface 1500. Illustratively, a search based on a page may return historical content representations associated with any number of characteristics or information shared or similar to the searched page. These characteristics or information may include text content, dates, content types, a browse session in which the network resource was encountered, tags, metadata, user ID, a browser, a client computing device, a common sequential or parallel navigation path, etc. For example, illustrative search interface 1500 may further include a navigation path results control 1512.

Illustratively, the navigation path results control 1512 may allow a user to filter search results by historical content representations of content originally in the same navigation path as a network resource or historical content representation selected in control 1510. In one embodiment, the user may filter the search results for historical content representations of content either prior or subsequent to the selected network resource or historical content representation in a navigation path.

Although not shown here for purposes of clarity, the illustrative search interface 1500 may further include an option or control allowing a user to restrict or filter results to past versions of a page selected in control 1510. For example, a user may have visited a Web page dedicated to breaking news a number of times in the past. Accordingly, the Web page may have contained different information each time it was viewed. Illustratively, the user may choose to limit a search to stored historical content representations of past versions of the Web page in order to find a specific story or news item.

Illustrative search interface 1500 may further include a control 1512 allowing a user to select between returning only historical content representations and returning a mix of historical content representations and current content from the network (e.g., a current Web search). In one embodiment, a depth of search field 1514 may allow a user to specify how many levels of referenced network resources to search, as discussed above with reference to FIGS. 9 and 14. For example, zero levels may indicate that the search should only return historical content representations corresponding to actually viewed network resources.

Still further, illustrative search interface 1500 may include a recommended results control 1516 for specifying that only recommended results should be returned by a search. In one embodiment, recommended results may correspond to historical content representations of network resources that have been ranked highly by other users, by a network computing and storage component 107, by the user at client computing device 102, by the historical browse storage component itself, or any other entity. In a further embodiment, recommended results may be based on the browsing behavior of past users.

Illustrative search interface 1500 may further include an unseen results control 1518 for specifying that only unseen results should be returned by a search. Illustratively, selecting this option may cause the search to return only historical content representations corresponding to referenced network resources (e.g., up to a level of references specified in control 1514 above), and not to display historical content representations corresponding to network resources that the client computing device 102 actually displayed (e.g., network resources on a user's historical browse path).

Although not depicted here for purposes of clarity, illustrative search interface 1500 may further include one or more controls or user interface options allowing a user to filter by a number of times a network resource or other piece of content has been viewed by a user or client computing device in the past. Illustrative search interface 1500 may still further include one or more controls or user interface options allowing a user to search by an amount of time spent viewing or interacting with a network resource or other piece of content. Illustrative search interface 1500 may still further allow a user to filter search results by a dominant color or color scheme, an association or inclusion of one or more advertisements in a network resource or piece of content, an association or inclusion of one or more pieces or types of embedded content in a network resource, or any other type of search filter or term.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments, or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein, in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable medium storing the computer executable components such as a CD-ROM, DVD-ROM, or network interface; further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method comprising:
   obtaining a historical content representation from a network computing provider, wherein the historical content representation comprises a historical version of a content item previously requested by a client computing device, and wherein the historical content representation includes information corresponding to a historical navigation path including the content item previously requested by the client computing device;

obtaining a search request from the client computing device, wherein the search request from the client computing device is associated with one or more search terms; and providing, to the client computing device, search results based on the search terms, wherein the search results include at least the historical content representation.

2. The computer-implemented method of claim 1, wherein the content item previously requested by the client computing device comprises a Web page.

3. The computer-implemented method of claim 1, wherein the search terms include a segment of text, a date, a content type, a browse session identifier, a user identifier, a browser identifier, a client computing device identifier, or a tag.

4. The computer-implemented method of claim 1, wherein a second representation of the content item previously requested by the client computing device is displayed at the client computing device.

5. The computer-implemented method of claim 1, wherein the information corresponding to the historical navigation path includes information associated with a reference accessed by the client computing device or a network resource including a reference accessed by the client computing device.

6. The computer-implemented method of claim 1, wherein the search results correspond to content included in the historical navigation path.

7. A system for managing content comprising:

one or more computer processors;

at least one computer memory accessible by at least one of the one or more computer processors; and a network computing component comprising an executable software module executed by the one or more computer processors, wherein the network computing component is operable to:

obtain a search request from a client computing device, wherein the search request from the client computing device is associated with one or more search terms; and provide search results corresponding to one or more historical content representations to the client computing device, the search results based at least partly on the one or more search terms, wherein each of the one or more historical content representations is associated with information corresponding to a historical navigation path uniquely associated with the client computing device, the historical navigation path including a content item corresponding to the respective each of the one or more historical content representations.

8. The system of claim 7, wherein the information corresponding to the historical navigation path includes an identifier identifying at least one of a reference followed by the client computing device to access a content item corresponding to the historical content representation and a network resource including the reference followed by the client computing device.

9. The system of claim 7, wherein the search results include search results corresponding to current network content.

10. The system of claim 7, wherein the one or more historical content representations correspond to content items included in a historical navigation path associated with a first historical content representation.

11. The system of claim 10, wherein the content item included in a historical navigation path associated with a first historical content representation comprises a content item included in the historical navigation path subsequent to the first historical content representation.

12. The system of claim 7, wherein the one or more historical content representations correspond to one or more historical versions of a first network resource.

13. The system of claim 7, wherein the network computing component is further operable to determine the search results based on a search request from the client computing device.

14. The system of claim 13, wherein the network computing component is further operable to determine the search results based in part on at least one of a segment of text, a date, a content type, a browse session identifier, a user identifier, a browser identifier, a client computing device identifier, and a tag.

15. The system of claim 13, wherein the network computing component is further operable to determine the search results based at least in part on a color composition of each of the one or more historical content representations.

16. The system of claim 13, wherein the network computing component is further operable to determine the search results based at least in part on a number of times that content corresponding to each of the one or more historical content representations has been requested.

17. The system of claim 13, wherein the network computing component is further operable to determine the search results based at least in part on an amount of time spent viewing content corresponding to each of the one or more historical content representations.

18. A computer-implemented method for managing content comprising:

obtaining search request from a client computing device, wherein the search request from the client computing device is associated with one or more search terms; and providing, based at least partly on the one or more search terms, search results corresponding to one or more historical content representations to the client computing device, wherein each of the one or more historical content representations is associated with information corresponding to a historical navigation path including the respective each of the one or more historical content representations, the historical navigation path uniquely associated with the client computing device.

19. The computer-implemented method of claim 18, wherein the information corresponding to the historical navigation path includes an identifier identifying at least one of a reference followed by the client computing device to access content corresponding to the historical content representation and a network resource including the reference followed by the client computing device.

20. The computer-implemented method of claim 18, wherein the search results include search results corresponding to current network content.

21. The computer-implemented method of claim 18, wherein the one or more historical content representations correspond to content included in a historical navigation path associated with a first historical content representation.

22. The computer-implemented method of claim 21, wherein the content included in a historical navigation path associated with a first historical content representation comprises content included in the historical navigation path prior to the first historical content representation.

23. The computer-implemented method of claim 18, wherein the one or more historical content representations correspond to one or more historical versions of a first network resource.

24. The computer-implemented method of claim 18 further comprising determining the search results based at least in part on an association between a first advertisement and each of the one or more historical content representations.

25. The computer-implemented method of claim 18 further comprising determining the search results based at least in part on at least one of a physical and a logical location associated with a request for content corresponding to each of the one or more historical content representations.

26. The computer-implemented method of claim 18 further comprising determining the search results based at least in part on a number of times that content corresponding to each of the one or more historical content representations has been requested.

27. The computer-implemented method of claim 26 further comprising determining the search results based at least in part on a number of times that content corresponding to each of the one or more historical content representations has been requested by at least one of the client computing device and a user associated with the client computing device.

28. The computer-implemented method of claim 26 further comprising determining the search results based at least in part on a number of times that content corresponding to each of the one or more historical content representations has been requested by users not associated with the client computing device.

29. The computer-implemented method of claim 18 further comprising determining the search results based at least in part on an amount of time spent viewing content corresponding to each of the one or more historical content representations.

* * * * *